(12) United States Patent
Sasaki et al.

(10) Patent No.: US 8,445,865 B2
(45) Date of Patent: May 21, 2013

(54) SCANNING MICROSCOPE DEVICE

(75) Inventors: Hiroshi Sasaki, Tokyo (JP); Tatsuo Nakata, Tokyo (JP)

(73) Assignee: Olympus Corporation, Tokyo (JP)

( * ) Notice: Subject to any disclaimer, the term of this patent is extended or adjusted under 35 U.S.C. 154(b) by 377 days.

(21) Appl. No.: 12/784,643

(22) Filed: May 21, 2010

(65) Prior Publication Data

US 2010/0294949 A1    Nov. 25, 2010

(30) Foreign Application Priority Data

May 22, 2009   (JP) ................. 2009-123912

(51) Int. Cl.
*G01J 1/58*   (2006.01)

(52) U.S. Cl.
USPC ...................................... 250/458.1

(58) Field of Classification Search
USPC ...................................... 250/458.1
See application file for complete search history.

(56) References Cited

U.S. PATENT DOCUMENTS

| | | | |
|---|---|---|---|
| 3,757,151 A * | 9/1973 | Ace .............................. | 313/39 |
| 4,831,263 A * | 5/1989 | Yamashita .................... | 250/368 |
| 6,356,700 B1 | 3/2002 | Strobl | |
| 6,403,332 B1 * | 6/2002 | Bearman et al. ............. | 435/29 |
| 6,496,307 B2 | 12/2002 | Engelhardt et al. | |
| 6,703,621 B2 * | 3/2004 | Wolleschensky .......... | 250/459.1 |
| 7,009,699 B2 | 3/2006 | Wolleschensky et al. | |
| 7,151,633 B2 | 12/2006 | Storz et al. | |
| 7,286,225 B2 | 10/2007 | Aikawa | |

| | | |
|---|---|---|
| 2002/0159144 A1 | 10/2002 | Engelhardt et al. |
| 2007/0206185 A1 | 9/2007 | Tuschel et al. |
| 2009/0040519 A1 | 2/2009 | Zhang |

FOREIGN PATENT DOCUMENTS

| | | |
|---|---|---|
| EP | 1 122 574 A2 | 8/2001 |
| EP | 1 308 715 A1 | 5/2003 |
| EP | 1 505 424 A1 | 2/2005 |
| JP | 2003-185581 A | 7/2003 |
| JP | 2004-354937 A | 12/2004 |
| JP | 2006-153763 A | 6/2006 |
| JP | 2007-163448 A | 6/2007 |
| WO | WO 01/09592 A1 | 2/2001 |

OTHER PUBLICATIONS

Extended European Search Report dated Dec. 13, 2010 (in English) in counterpart European Application No. 10005238.0.

(Continued)

*Primary Examiner* — David Porta
*Assistant Examiner* — Edwin Gunberg
(74) *Attorney, Agent, or Firm* — Holtz, Hotlz, Goodman & Chick, P.C.

(57) ABSTRACT

A scanning microscope device includes a light source that emits laser light; an X-Y galvanometer mirror that scans the laser light on a sample; an objective lens that irradiates the sample with the scanned laser light and collects fluorescence generated at an irradiated position; a non-descan-detection excitation DM that is disposed between the X-Y galvanometer mirror and the objective lens and separates the laser light and the fluorescence from each other; a fiber that receives the separated fluorescence through an entrance end thereof and emits the fluorescence from an exit end thereof that is formed in a substantially linear shape; a diffraction grating that disperses the fluorescence emitted from the exit end of the fiber in a direction orthogonal to a longitudinal direction of the exit end; and a multi-anode PMT having plural cells arrayed in the dispersing direction of the dispersed fluorescence.

39 Claims, 10 Drawing Sheets

OTHER PUBLICATIONS

Piston et al.: "Two-photon-excitation fluorescence imaging of three-dimensional calcium-ion activity": Applied Optics: vol. 33, No. 4: (Feb. 1, 1994): pp. 662-669: XP-002612030.
Partial European Search Report dated Aug. 26, 2010 (in English) issued in counterpart European Application No. 10005238.0.
European Office Action dated Aug. 7, 2012 (in English) in counterpart European Application No. 10 005 238.0.
Japanese Office Action dated Feb. 26, 2013 issued in counterpart Japanese Application No, 2009-123912.

* cited by examiner

SCANNING MICROSCOPE DEVICE

BACKGROUND OF THE INVENTION

1. Field of the Invention

The present invention relates to scanning microscope devices.

This application is based on Japanese Patent Application No. 2009-123912, the content of which is incorporated herein by reference.

2. Description of Related Art

In the related art, a known microscope device has a spectroscope disposed in a light-detection optical path so as to perform spectrum detection of light released from a sample (for example, see Japanese Unexamined Patent Application, Publication No. 2003-185581). In Japanese Unexamined Patent Application, Publication No. 2003-185581, a laser scanning microscope (LSM) is configured to disperse light passing through a confocal pinhole in a descan optical path by using a diffraction grating, and to acquire spectral data by using a multi-anode photomultiplier tube (PMT) having 32 detectors (cells) disposed one-dimensionally at positions where the spectrum is generated. Furthermore, Japanese Unexamined Patent Application, Publication No. 2003-185581 also discusses disposing a diffraction grating and a multi-anode PMT in a non-descan optical path effective for multiphoton detection so as to perform spectrum detection of non-descan light in a similar manner to that of descan light.

However, when an image is formed in the non-descan optical path at a conjugate position with respect to a confocal pinhole in FIG. 6 of Japanese Unexamined Patent Application, Publication No. 2003-185581, the light moves in the confocal pinhole in a direction orthogonal to the optical axis simultaneously with the scanning process, which is a problem in that spectral data of only a single point near the optical-axis center of a sample surface can be acquired. Another problem is that, since scattered light is blocked by the confocal pinhole or a slit disposed in the light-detection optical path, the detection efficiency of fluorescence is significantly impaired. Moreover, when a pupil position of an objective lens is disposed at a conjugate position with respect to the aforementioned pinhole, the angle of incidence of light incident on the pinhole may change due to scanning, but the position thereof does not. However, since a pupil has a certain surface area, a large portion of projected incident light is blocked by the pinhole, resulting in a significant loss in the fluorescence.

BRIEF SUMMARY OF THE INVENTION

The present invention provides a scanning microscope device that can achieve a high S/N ratio and can perform spectrum detection at high sensitivity and high speed.

A first aspect of the present invention provides a scanning microscope device that includes a light source that irradiates a sample with laser light; a scanner that scans the laser light from the light source on the sample; an objective lens that irradiates the sample with the laser light scanned by the scanner and collects fluorescence generated at an irradiated position of the laser light; a wavelength separator that is disposed between the scanner and the objective lens and separates the laser light and the fluorescence from each other; an fiber for epi-fluorescence that receives the fluorescence separated by the wavelength separator through an entrance end thereof, guides the fluorescence, and emits the fluorescence from an exit end thereof that is formed in a substantially linear shape; a dispersing element that disperses the fluorescence emitted from the exit end of the fiber for epi-fluorescence in a direction orthogonal to the longitudinal direction of the exit end; and a multi-anode photomultiplier tube having a plurality of detectors arrayed in the dispersing direction of the fluorescence dispersed by the dispersing element.

According to this aspect, when the sample is irradiated, via the objective lens, with the laser light emitted from the light source and scanned by the scanner, the fluorescence generated in the sample is collected by the objective lens and separated by the wavelength separator before being guided to the dispersing element by the fiber for epi-fluorescence. The fluorescence is then dispersed by the dispersing element and is detected by the plurality of detectors of the multi-anode photomultiplier tube.

In this scanning microscope device, the wavelength separator separates the fluorescence generated in the sample from the optical path of the laser light without returning the fluorescence to the scanner, and the fiber for epi-fluorescence guides the fluorescence to the multi-anode photomultiplier tube, thereby minimizing the loss of fluorescence in the optical path from the sample to the multi-anode photomultiplier tube.

In addition, since the exit end of the fiber for epi-fluorescence is formed in a linear shape extending in the dispersing direction of the dispersing element, that is, in a direction orthogonal to the arrayed direction of the detectors of the multi-anode photomultiplier tube, the fluorescence collected by the objective lens can be made incident on the detectors without loss. Thus, the dispersed fluorescence can be detected at once by each detector, thereby allowing for spectrum detection at a high S/N ratio, high sensitivity, and high speed.

In the first aspect, the scanning microscope device may further include a condenser lens that collects fluorescence generated in a transmission direction at the irradiated position of the laser light scanned on the sample by the scanner; a fiber for transmission fluorescence that receives the fluorescence collected by the condenser lens through an entrance end thereof, guides the fluorescence, and emits the fluorescence toward the dispersing element from an exit end thereof that is formed in a substantially linear shape extending in a direction orthogonal to the dispersing direction of the dispersing element; and a transmitted-fluorescence entrance section that causes the fluorescence emitted from the exit end of the fiber for transmission fluorescence to enter an optical path of the fluorescence emitted from the exit end of the fiber for epi-fluorescence so as to cause the fluorescence from the fiber for transmission fluorescence to be incident on the dispersing element in place of the fluorescence from the fiber for epi-fluorescence.

With this configuration, by actuating the transmitted-fluorescence entrance section, the fluorescence from the fiber for transmission fluorescence is made incident on the dispersing element in place of the fluorescence from the fiber for epi-fluorescence, whereby the multi-anode photomultiplier tube can detect the fluorescence generated in the sample in the transmission direction of the laser light. Consequently, spectrum detection of fluorescence generated in the direction in which it returns from the sample and spectrum detection of fluorescence generated in the direction in which it is transmitted through the sample can be performed in a switching manner.

A second aspect of the present invention provides a scanning microscope device that includes a light source that irradiates a sample with laser light; a scanner that scans the laser light from the light source on the sample; a condenser lens that collects fluorescence generated in a transmission direction at an irradiated position of the laser light scanned on the sample by the scanner; a fiber for transmission fluorescence that receives the fluorescence collected by the condenser lens through an entrance end thereof, guides the fluorescence, and emits the fluorescence from an exit end thereof that is formed in a substantially linear shape; a dispersing element that disperses the fluorescence emitted from the exit end of the fiber for transmission fluorescence in a direction orthogonal to the longitudinal direction of the exit end; and a multi-anode photomultiplier tube having a plurality of detectors arrayed in the dispersing direction of the fluorescence dispersed by the dispersing element.

According to this aspect, when the sample is irradiated with the laser light emitted from the light source and scanned by the scanner, the fluorescence generated in the sample in the transmission direction of the laser light is collected by the condenser lens and is guided to the dispersing element by the fiber for transmission fluorescence. Thus, the loss of fluorescence in the optical path from the sample to the multi-anode photomultiplier tube can be minimized, thereby allowing for spectrum detection at a high S/N ratio, high sensitivity, and high speed.

In the above aspect, the scanning microscope device may further include a fluorescence returner that is disposed in a replaceable manner with the wavelength separator and that returns the fluorescence collected by the objective lens to an optical path of the laser light; switching means that switches between the fluorescence returner and the wavelength separator; a confocal pinhole that is disposed at a conjugate position with respect to a focal position of the objective lens and that allows part of the fluorescence returned to the optical path of the laser light by the fluorescence returner, switched by the switching means, and transmitted through the scanner to pass therethrough; and a descanned fluorescence entrance section that causes the fluorescence passing through the confocal pinhole to enter the optical path of the fluorescence emitted from the exit end of the fiber for epi-fluorescence.

With this configuration, by disposing the fluorescence returner on the optical path in place of the wavelength separator by using the switching means, the fluorescence generated in the sample can be returned to the scanner by the fluorescence returner. Then, the fluorescence passes through the confocal pinhole and is made to enter the optical path from the fiber for epi-fluorescence by the descanned fluorescence entrance section. Thus, the fluorescence not to be returned to the scanner and the fluorescence to be returned to the scanner can be observed in a switching manner, whereby the configuration used for spectrum detection in the multiphoton excitation observation mode can be shared with the configuration used for spectrum detection in the single-photon excitation observation mode.

Furthermore, in the above aspect, the entrance end of the fiber for epi-fluorescence may be disposed at a conjugate position with respect to a pupil position of the objective lens, and may have a diameter and a maximum light-receivable angle that satisfy the following formulas:

$$\Phi D_r \geq \Phi p_o \times \beta_{PL}$$

$$\alpha_{re} \geq \theta a$$

where $\Phi D_r$ denotes the diameter of the entrance end of the fiber for epi-fluorescence, $\Phi p_o$ denotes a pupil diameter of the objective lens, $\beta_{PL}$ denotes the projection magnification from the pupil position of the objective lens to the entrance end of the fiber for epi-fluorescence, $\alpha_{re}$ denotes the maximum light-receivable angle of the entrance end of the fiber for epi-fluorescence, and $\theta a$ denotes a maximum angle of incidence at the entrance end of the fiber for epi-fluorescence, determined on the basis of a scan range of the scanner.

With the diameter and the maximum light-receivable angle of the entrance end of the fiber for epi-fluorescence satisfying the aforementioned formulas, the fluorescence from the entire scan range of the scanner can be made incident on the entrance end of the fiber for epi-fluorescence, thereby preventing optical loss in the fluorescence.

Furthermore, in the above aspect, the maximum light-receivable angle of the entrance end of the fiber for epi-fluorescence may further satisfy the following formula:

$$\alpha_{re} > \theta b$$

where $\alpha_{re}$ denotes the maximum light-receivable angle of the entrance end of the fiber for epi-fluorescence, and $\theta b$ denotes a maximum angle of incidence at the entrance end of the fiber for epi-fluorescence, determined on the basis of a capturable field of view of the objective lens.

Since there is a large amount of scattered light in a deep section of the sample (for example, about 500 µm from the surface of the sample), fluorescence is also generated from outside the scan range. With the maximum light-receivable angle of the entrance end of the fiber for epi-fluorescence satisfying the aforementioned formula, a greater amount of scattered fluorescence can be collected when observing a deep section.

Furthermore, in the above aspect, the exit end of the fiber for epi-fluorescence may have a widthwise dimension and a lengthwise dimension that satisfy the following formulas:

$$W \times \beta_{PM} < P_W$$

$$H_r \times \beta_{PM} < P_h$$

$$\alpha_{ro} \div \beta_{PM} < \theta p$$

where W denotes the widthwise dimension of the exit end of the fiber for epi-fluorescence, $\beta_{PM}$ denotes the magnification at which the exit end of the fiber for epi-fluorescence is projected onto the multi-anode photomultiplier tube, $P_W$ denotes a widthwise dimension of each detector of the multi-anode photomultiplier tube in the arrayed direction thereof, $H_r$ denotes the lengthwise dimension of the exit end of the fiber for epi-fluorescence, $P_h$ denotes a dimension of each detector of the multi-anode photomultiplier tube in a direction orthogonal to the arrayed direction, $\alpha_{ro}$ denotes an emission angle of the fiber for epi-fluorescence, and $\theta p$ denotes a permissible light-receiving angle of the multi-anode photomultiplier tube.

With the widthwise and lengthwise dimensions of the exit end of the fiber for epi-fluorescence satisfying the aforementioned formulas, the fluorescence emitted from the exit end of the fiber for epi-fluorescence can efficiently be made incident on the multi-anode photomultiplier tube without loss of wavelength resolution.

Furthermore, in the above aspect, the entrance end of the fiber for transmission fluorescence may be disposed at a conjugate position with respect to a pupil position of the condenser lens, and may have a diameter and a maximum light-receivable angle that satisfy the following formulas:

$$\Phi D_t > \Phi P_c \times \beta_{cd}$$

$$\alpha_{te} > \theta c$$

where $\Phi D_t$ denotes the diameter of the entrance end of the fiber for transmission fluorescence, $\Phi P_c$ denotes a pupil diameter of the condenser lens, $\beta_{cd}$ denotes the projection magnification from the pupil position of the condenser lens to the entrance end of the fiber for transmission fluorescence, $\alpha_{te}$ denotes the maximum light-receivable angle of the fiber for transmission fluorescence, and $\theta c$ denotes a maximum angle of incidence at the fiber for transmission fluorescence, determined on the basis of a scan range of the scanner.

With the diameter and the maximum light-receivable angle of the entrance end of the fiber for transmission fluorescence satisfying the aforementioned formulas, the fluorescence from the entire scan range of the scanner can be made incident on the entrance end of the fiber for transmission fluorescence, thereby preventing optical loss in the fluorescence.

Furthermore, in the above aspect, the maximum light-receivable angle of the entrance end of the fiber for transmission fluorescence may further satisfy the following formula:

$$\alpha_{te} > \theta d_t$$

where $\alpha_{te}$ denotes the maximum light-receivable angle of the fiber for transmission fluorescence, and $\theta_t$ denotes a maximum angle of incidence at the fiber for transmission fluorescence, determined on the basis of a capturable field of view of the condenser lens.

With the maximum light-receivable angle of the entrance end of the fiber for transmission fluorescence satisfying the aforementioned formula, a greater amount of scattered fluorescence can be collected when observing a deep section.

Furthermore, in the above aspect, the exit end of the fiber for transmission fluorescence may have a widthwise dimension and a lengthwise dimension that satisfy the following formulas:

$$W \times \beta_{PM} < P_W$$

$$H_t \times \beta PM < P_h$$

$$\alpha_{to} \div \beta_{PM} < \theta p$$

where W denotes the widthwise dimension of the exit end of the fiber for transmission fluorescence, $\beta_{PM}$ denotes the magnification at which the exit end of the fiber for transmission fluorescence is projected onto the multi-anode photomultiplier tube, $P_W$ denotes a widthwise dimension of each detector of the multi-anode photomultiplier tube in the arrayed direction thereof, $H_t$ denotes the lengthwise dimension of the exit end of the fiber for epi-fluorescence, $P_h$ denotes a dimension of each detector of the multi-anode photomultiplier tube in a direction orthogonal to the arrayed direction, $\alpha_{to}$ denotes an emission angle of the fiber for transmission fluorescence, and $\theta p$ denotes a permissible light-receiving angle of the multi-anode photomultiplier tube.

With the widthwise and lengthwise dimensions of the exit end of the fiber for transmission fluorescence satisfying the aforementioned formulas, the fluorescence emitted from the exit end of the fiber for transmission fluorescence can efficiently be made incident on the multi-anode photomultiplier tube without loss of wavelength resolution.

Furthermore, in the above aspect, the scanning microscope device may further include a plurality of cylindrical lenses arrayed in the vicinity of light-receiving surfaces of the detectors of the multi-anode photomultiplier tube, in which the cylindrical lenses may be arrayed at a pitch that substantially matches a pitch at which the detectors are arrayed, and the cylindrical lenses may be disposed in correspondence with the respective detectors.

With this configuration, even when there are neutral zones (gaps) for forming electrodes between the detectors of the multi-anode photomultiplier tube, the cylindrical lenses can cause the fluorescence to be efficiently incident on the light-receiving surfaces of the respective detectors so as to prevent optical loss in the fluorescence caused by the gaps.

Furthermore, in the above aspect, a dimension of each cylindrical lens in a direction with no lens power may be greater than a dimension of an incidence range of the fluorescence to be incident on each detector.

With this configuration, optical loss in the fluorescence to be incident on the detectors of the multi-anode photomultiplier tube can be prevented.

Furthermore, in the above aspect, the scanning microscope device may further include an image processor that performs wavelength separation on the fluorescence detected by the detectors, and a monitor that displays an image of the fluorescence subjected to the wavelength separation performed by the image processor.

With this configuration, the image processor can separate multiple fluorochromes with large crossover and display them on the monitor.

Furthermore, in the above aspect, the scanning microscope device may further include a storage section that stores spectrum detection results of the sample at predetermined intervals of time.

With this configuration, temporal changes in the sample can be observed.

Furthermore, in the above aspect, each detector may include a photoelectric surface that performs photoelectric conversion on the fluorescence, and the multi-anode photomultiplier tube may include a cooling device that cools the photoelectric surfaces.

With this configuration, the cooling device can cool the photoelectric surfaces of the detectors so as to reduce noise in the multi-anode photomultiplier tube. Thus, the S/N ratio can be improved.

Furthermore, in the above aspect, a microscope section having the objective lens is separately provided from a detection unit, wherein the microscope section is optically connected to the detection unit via the fiber for epi-fluorescence, wherein each detector includes a photoelectric surface that performs photoelectric conversion on the fluorescence, wherein a cooling device that cools the photoelectric surfaces is equipped with the multi-anode photomultiplier tube, and wherein the detection unit including the multi-anode photomultiplier tube comprises a heat exhauster that externally releases heat generated when the photoelectric surfaces are cooled by the cooling device.

With this configuration, the heat exhauster can prevent a temperature increase in the multi-anode photomultiplier tube caused when the cooling device generates heat.

Furthermore, in the above aspect, a microscope section having the objective lens is separately provided from a detection unit, wherein the microscope section is optically connected to the detection unit via the fiber for epi-fluorescence and/or the fiber for transmission fluorescence, wherein each detector includes a photoelectric surface that performs photoelectric conversion on the fluorescence, wherein a cooling device that cools the photoelectric surfaces is equipped with the multi-anode photomultiplier tube, and wherein the detection unit including the multi-anode photomultiplier tube comprises a heat exhauster that externally releases heat generated when the photoelectric surfaces are cooled by the cooling device.

Furthermore, in the above aspect, a microscope section having the objective lens is separately provided from a detection unit, wherein the microscope section is optically connected to the detection unit via the fiber for transmission fluorescence, wherein each detector includes a photoelectric surface that performs photoelectric conversion on the fluorescence, wherein a cooling device that cools the photoelectric surfaces is equipped with the multi-anode photomultiplier tube, and wherein the detection unit including the multi-anode photomultiplier tube comprises a heat exhauster that externally releases heat generated when the photoelectric surfaces are cooled by the cooling device.

The present invention advantageously achieves the ability to perform spectrum detection at a high S/N ratio, high sensitivity, and high speed.

DETAILED DESCRIPTION OF THE INVENTION

First Embodiment

A scanning microscope device according to a first embodiment of the present invention will be described below with reference to the drawings.

Figure 1:
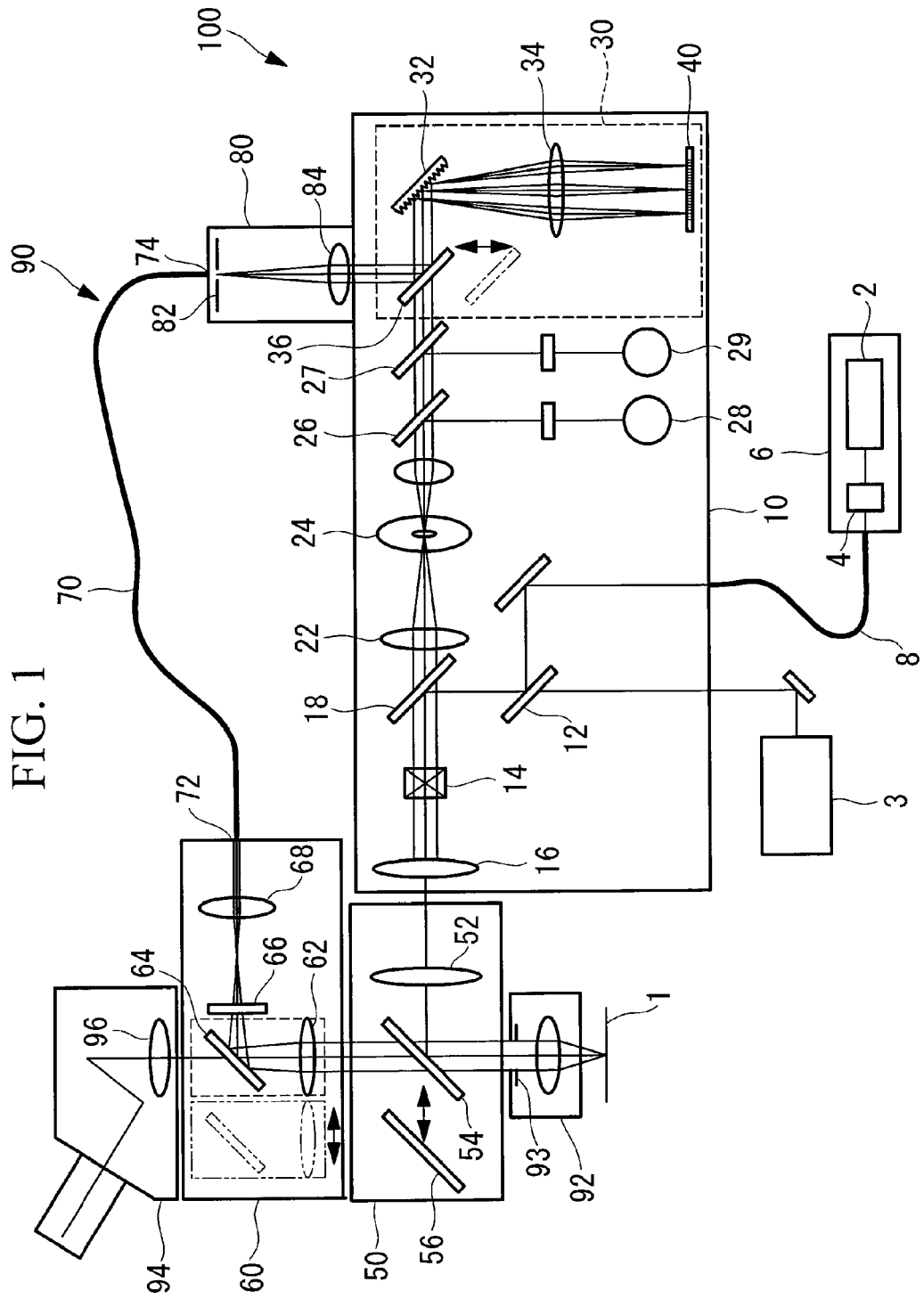
FIG. 1 is a schematic configuration diagram of a scanning microscope device according to a first embodiment of the present invention.

As shown in FIG. 1, a scanning microscope device 100 according to this embodiment is a microscope device that allows for observation of a sample 1 by switching between a single-photon excitation observation mode and a multiphoton excitation observation mode. The sample 1 may be, for example, biological cells (multi-stained fluorescent sample) labeled with multiple fluorochromes with large crossover in fluorescence wavelengths, such as CFP (cyan fluorescent protein), GFP (green fluorescent protein), and YFP (yellow fluorescent protein).

The scanning microscope device 100 includes a single-photon-excitation light source (light source) 2 and a multiphoton-excitation light source (light source) 3 (simply referred to as "light sources 2 and 3" hereinafter) that irradiate the sample 1 with laser light, a scan unit 10 and a scan-unit guiding projector tube 50 having an optical path for single-photon-excitation observation, an objective lens 92 that irradiates the sample 1 with the laser light emitted from the light sources 2 and 3 and collects fluorescence generated at the irradiated position of the sample 1, and an epi-illumination-observation optical system 90 that constitutes an optical path for multiphoton-excitation observation. Reference numeral 94 denotes a microscope lens barrel for visual observation.

The single-photon-excitation light source 2 is, for example, an ArKr (argon-krypton) laser. The single-photon-excitation light source 2 is provided in a visible laser unit 6. The visible laser unit 6 is provided with an AOTF (wavelength tunable filter) 4 that controls the transmission wavelength of the laser light emitted from the single-photon-excitation light source 2. Reference numeral 8 denotes a visible-light single-mode fiber that guides the laser light from the visible laser unit 6 to the scan unit 10.

The multiphoton-excitation light source 3 is, for example, an IR pulsed laser.

The scan unit 10 includes a scanner combining DM (dichroic mirror) 12 that guides the laser light emitted from the light sources 2 and 3 to the same optical path, an X-Y galvanometer mirror (scanner) 14 that reflects the laser light from the scanner combining DM 12 so as to scan the laser light on the sample 1, and a pupil projection lens 16 that focuses the laser light reflected by the X-Y galvanometer mirror 14.

The scan-unit guiding projector tube 50 includes an image forming lens 52 that collimates the laser light transmitted through the pupil projection lens 16 of the scan unit 10, and a fluorescence returning mirror (fluorescence returner) 54 that reflects the laser light transmitted through the image forming lens 52 so as to cause the laser light to enter the objective lens 92 and that also reflects the fluorescence generated in the sample 1 so as to return the fluorescence to the scan unit 10. Reference numeral 93 denotes a pupil position of the objective lens 92.

In single-photon excitation observation, the fluorescence returning mirror 54 returns the fluorescence from the sample 1 to the X-Y galvanometer mirror 14 so as to perform descanning. The fluorescence returning mirror 54 is disposed in an insertable and removable manner in an optical path between the X-Y galvanometer mirror 14 and the objective lens 92. The fluorescence returning mirror 54 can be replaced with a non-descan-detection excitation DM (wavelength separator) 56 by using switching means (not shown).

The non-descan-detection excitation DM 56 is used for detecting (descanning) the fluorescence from the sample 1 in multiphoton excitation observation without returning the fluorescence to the X-Y galvanometer mirror 14. The non-descan-detection excitation DM 56 reflects the laser light from the image forming lens 52 so as to cause the laser light to enter the objective lens 92, and transmits the fluorescence from the sample 1 so as to separate the laser light and the fluorescence from each other. The switching means is not limited in particular, and may be, for example, means for manually switching between the fluorescence returning mirror 54 and the non-descan-detection excitation DM 56 or may be an automatic switching device.

The scan unit 10 includes an excitation DM 18 that separates, from the laser light, the fluorescence that is generated in the sample 1 irradiated with the laser light and that is collected by the objective lens 92 before returning in the reverse direction along the optical path of the laser light via the fluorescence returning mirror 54 and the X-Y galvanometer mirror 14, a confocal lens 22 that collects the fluorescence separated by the excitation DM 18, and a confocal pinhole 24 that is disposed at a conjugate position with respect to a focal position of the objective lens 92 and that allows part of the fluorescence collected by the confocal lens 22 to pass therethrough.

Furthermore, the scan unit 10 also includes a first spectral DM 26 and a second spectral DM 27 that partially transmit and partially reflect the fluorescence passing through the confocal pinhole 24, a one-channel photomultiplier tube (1CH_PMT) 28 that detects the intensity of the fluorescence reflected by the first spectral DM 26, a two-channel photomultiplier tube (2CHPMT) 29 that detects the intensity of the fluorescence reflected by the second spectral DM 27, and a spectrum detection unit 30 that performs spectrum detection of the fluorescence transmitted through the first spectral DM 26 and the second spectral DM 27.

The spectrum detection unit 30 includes a diffraction grating 32 that disperses the fluorescence in one direction, a focusing lens 34 that focuses the fluorescence dispersed by the diffraction grating 32, and a multi-anode photomultiplier tube (PMT) 40 having a plurality of cells 42 (detectors, see FIG. 2) that detect the fluorescence focused by the focusing lens 34.

The multi-anode PMT 40 is configured such that the cells 42 are arrayed one-dimensionally in the dispersing direction of the fluorescence dispersed in one direction by the diffraction grating 32. The multi-anode PMT 40 may be, for example, a 32-channel multi-anode PMT (manufactured by Hamamatsu Photonics K. K.) having a one-dimensional array of 32 cells 42.

Figure 2:
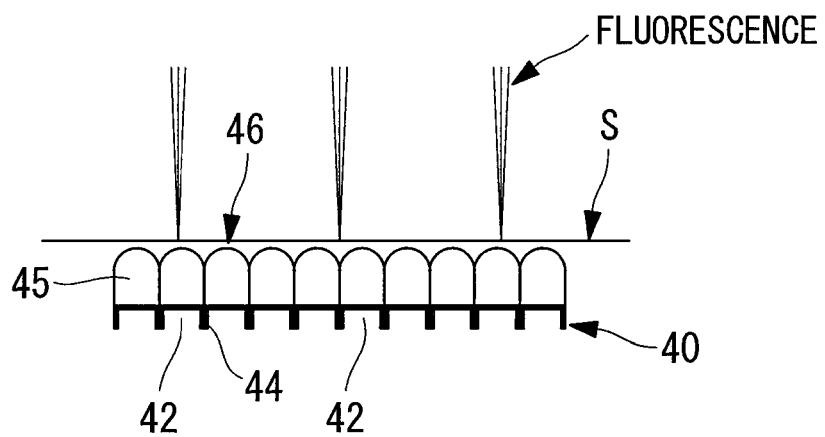
FIG. 2 is an enlarged schematic diagram of a multi-anode PMT in FIG. 1.
Figure 3:
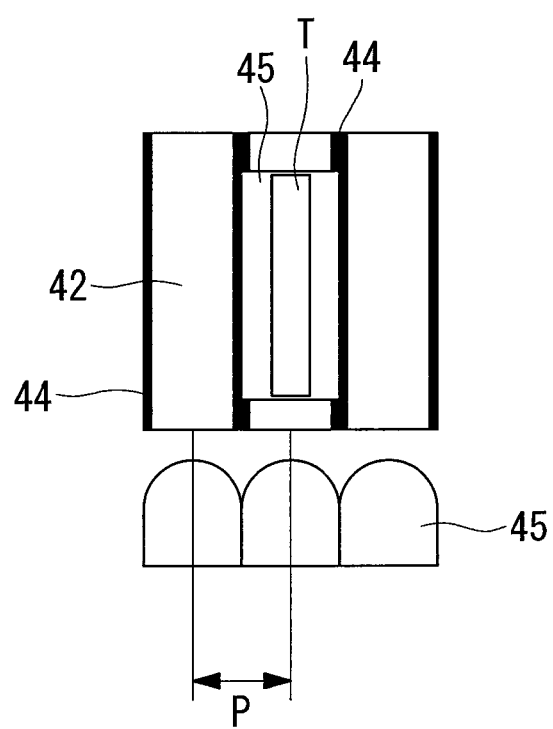
FIG. 3 is an enlarged schematic diagram of cells in FIG. 2.

As shown in FIG. 2, if there are gaps (neutral zones) 44 for forming electrodes between the cells 42 of the multi-anode PMT 40, a cylindrical lens array 46 constituted of a plurality of cylindrical lenses 45 may be disposed in the vicinity of light-receiving surfaces of the cells 42. In that case, as shown in FIG. 3, it is desirable that the cylindrical lenses 45 be arrayed at a pitch that substantially matches the array pitch of the cells 42 (see reference character P in FIG. 3) so as to be arranged in a one-to-one relationship with the respective cells 42. In FIG. 2, reference character S denotes an image forming plane of spectral lines of the fluorescence dispersed by the diffraction grating 32. It is desirable that an incidence plane of the cylindrical lenses 45 and the image forming plane of the spectral lines be substantially aligned with each other.

As shown in FIG. 3, regarding each of the cylindrical lenses 45, it is desirable that the dimension thereof in a direction in which there is no lens power substantially match the dimension in a direction orthogonal to the arrayed direction of the cells 42 and be set greater than the dimension of an incidence range of fluorescence to be incident on each cell 42 (for example, a lengthwise dimension of an exit end 74 (see FIG. 4C) of an epi-illumination fiber (fiber for epi-fluorescence) 70 projected onto the cell 42). Consequently, the cylindrical lens 45 can make the fluorescence efficiently incident on the light-receiving surface of the cell 42 so as to prevent optical loss in the fluorescence caused by the gaps 44. In FIG. 3, reference character T denotes a projected image of the exit end 74 of the epi-illumination fiber 70.

The spectrum detection unit 30 is provided with a first switching mirror (descanned fluorescence entrance section) 36 that combines the fluorescence from the optical path for multiphoton excitation observation with the optical path of the fluorescence for single-photon excitation observation to be incident on the diffraction grating 32 (i.e., the optical path of the fluorescence from the second spectral DM 27). The first switching mirror 36 causes the fluorescence emitted from the exit end 74 of the epi-illumination fiber 70 to enter the optical path of the fluorescence passing through the confocal pinhole 24.

The first switching mirror 36 is disposed in an insertable and removable manner in the optical path between the second spectral DM 27 and the diffraction grating 32, and is removed from the optical path by the switching means when performing single-photon excitation observation and is disposed in the optical path when performing multiphoton excitation observation.

The epi-illumination-observation optical system 90 includes an epi-illumination non-descan unit 60 that receives the fluorescence from the scan-unit guiding projector tube 50 having the non-descan-detection excitation DM 56 disposed therein in place of the fluorescence returning mirror 54 during multiphoton excitation observation, the epi-illumination fiber 70 that introduces the fluorescence from the epi-illumination non-descan unit 60 into the spectrum detection unit 30 of the scan unit 10, and an epi-illumination-fiber guiding unit 80.

The epi-illumination non-descan unit 60 includes a first projector lens 62 that receives the fluorescence transmitted through the non-descan-detection excitation DM 56, a reflecting mirror 64 that reflects the fluorescence transmitted through the first projector lens 62, an IR cut filter 66 that removes infrared light from the fluorescence reflected by the reflecting mirror 64, and a second projector lens 68 that collects the fluorescence with the infrared light removed therefrom by the IR cut filter 66 and introduces the fluorescence into an end of the epi-illumination fiber 70.

The pupil position 93 of the objective lens 92 and an entrance end (denoted by reference numeral 72 in FIG. 1) of the epi-illumination fiber 70 have an optically conjugate relationship achieved by the first projector lens 62 and the second projector lens 68.

The first projector lens 62 and the reflecting mirror 64 are disposed in an insertable and removable manner in the optical path of the fluorescence. When the first projector lens 62 and the reflecting mirror 64 are removed from the optical path of the fluorescence, the fluorescence from the sample 1 enters the microscope lens barrel 94 so that visual observation can be performed using a transmission light source (not shown) or the like.

Figure 4A:
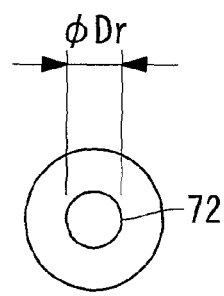
FIG. 4A is a diagram illustrating an entrance end of an epi-illumination fiber in FIG. 1.
Figure 4B:
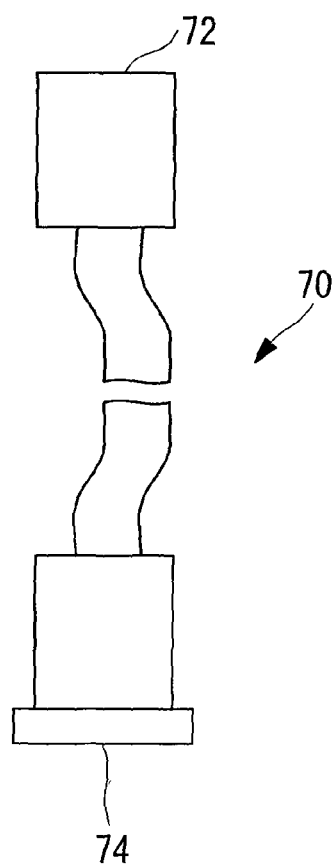
FIG. 4B is a diagram illustrating the entire epi-illumination fiber in FIG. 4A.
Figure 4C:
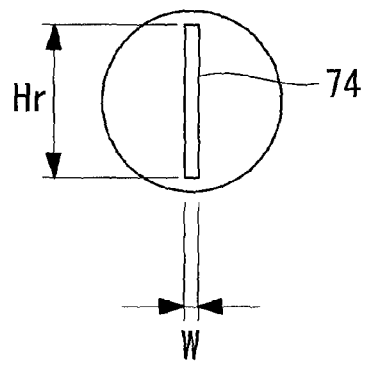
FIG. 4C is a diagram illustrating an exit end of the epi-illumination fiber in FIG. 4B.

As shown in FIGS. 4A to 4C, the epi-illumination fiber 70 includes the entrance end 72 that receives the fluorescence collected by the second projector lens 68 of the epi-illumination non-descan unit 60, and the exit end 74 that emits the guided fluorescence towards the epi-illumination-fiber guiding unit 80, and is constituted of a fiber bundle formed by bundling multiple fibers together.

The entrance end 72 of the epi-illumination fiber 70 is disposed at a conjugate position with respect to the pupil position 93 of the objective lens 92, and is formed in a substantially circular shape, as shown in FIG. 4A, by bundling multiple fibers together in a circle. The diameter and the maximum light-receivable angle of the entrance end 72 are set so as to satisfy the following formulas (1) and (2) (see FIGS. 4A and 5):

$$\Phi D_r > \Phi p_o \times \beta_{PL} \tag{1}$$

$$\alpha_{re} > \theta a \tag{2}$$

where $\Phi D_r$ denotes the diameter of the entrance end 72 of the epi-illumination fiber 70, $\Phi p_o$ denotes the pupil diameter of the objective lens 92, $\beta_{PL}$ denotes the projection magnification from the pupil position of the objective lens 92 to the entrance end 72 of the epi-illumination fiber 70, $\alpha_{re}$ denotes the maximum light-receivable angle of the entrance end 72 of the epi-illumination fiber 70, and θa denotes the maximum angle of incidence at the entrance end 72 of the epi-illumination fiber 70, determined on the basis of a rotating-angle range of the X-Y galvanometer mirror 14.

Figure 5:
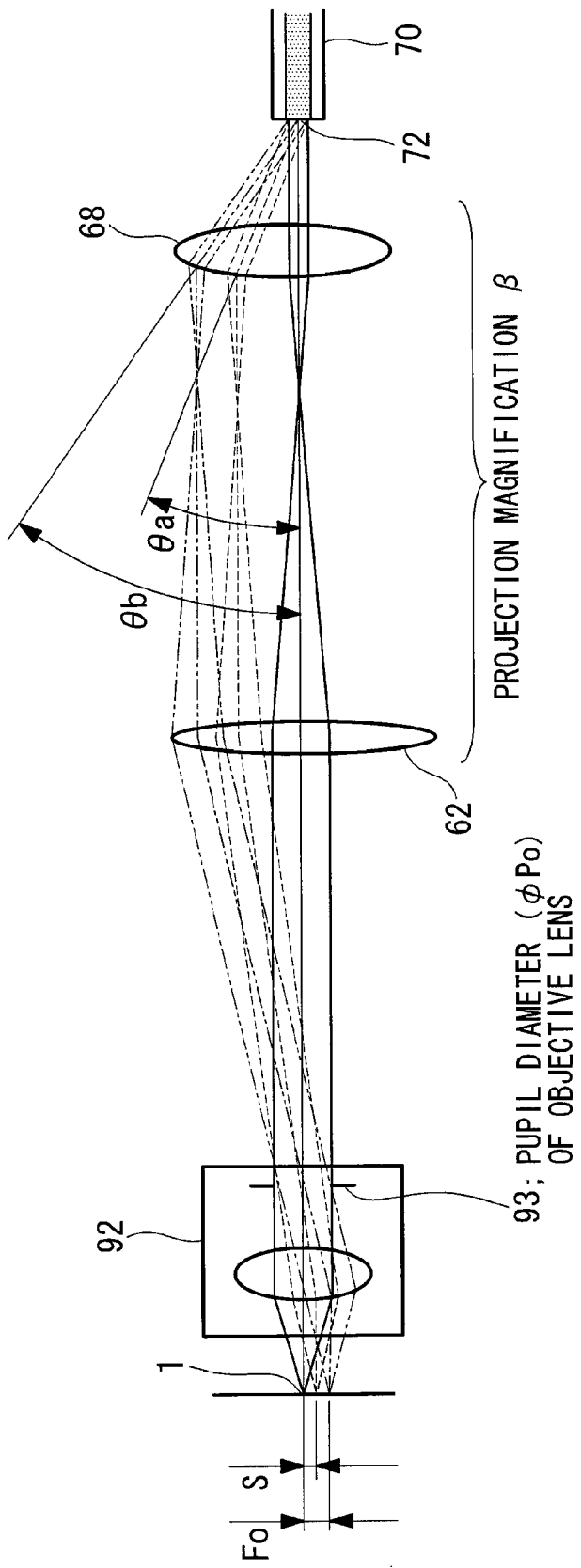
FIG. 5 is a schematic diagram illustrating an optical system between an objective lens and the entrance end of the epi-illumination fiber in FIG. 1.

In FIG. 5, reference character S denotes an image height (i.e., height from the center of an image) of a scan range determined on the basis of the rotating-angle range of the X-Y galvanometer mirror 14, reference character $F_o$ denotes an image height determined on the basis of a capturable field of view of the objective lens 92, and reference symbol θb denotes a maximum angle of incidence at the entrance end 72 of the epi-illumination fiber 70, determined on the basis of the capturable field of view of the objective lens 92.

Figure 6:
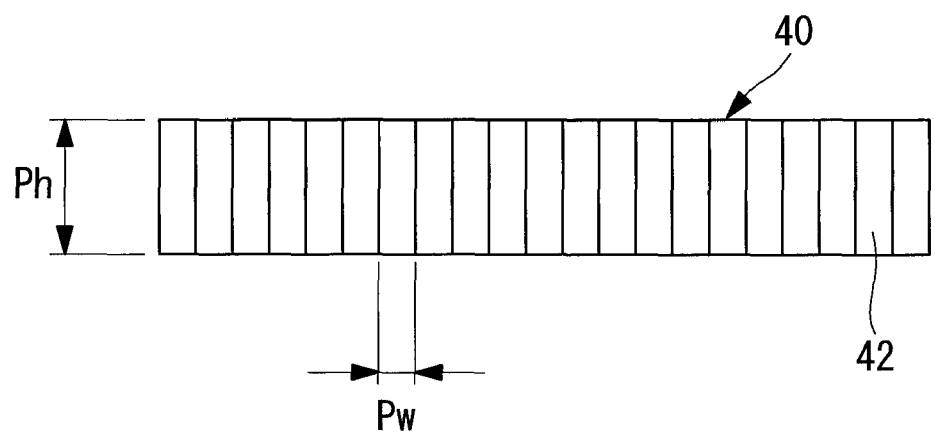
FIG. 6 is another enlarged schematic diagram of the multi-anode PMT in FIG. 1.

As shown in FIG. 4C, the exit end 74 of the epi-illumination fiber 70 is formed by bundling fibers together in a linear form so as to be formed in a substantially linear shape extending in the dispersing direction of the diffraction grating 32, that is, in a direction orthogonal to the arrayed direction of the cells 42 of the multi-anode PMT 40. The widthwise and lengthwise dimensions of the exit end 74 are set so as to satisfy the following formulas (3), (4), and (5) (see FIGS. 4C and 6):

$$W \times \beta_{PM} < P_W \quad (3)$$

$$H_r \times \beta_{PM} < P_h \quad (4)$$

$$\alpha_{ro} \div \beta_{PM} < \theta p \quad (5)$$

where W denotes the widthwise dimension of the exit end 74 of the epi-illumination fiber 70 (if the widthwise dimension of an entrance slit 82 is smaller than W, the widthwise dimension of the entrance slit 82 is defined as W), $\beta_{PM}$ denotes the magnification at which the exit end 74 of the epi-illumination fiber 70 is projected onto each cell 42 of the multi-anode PMT 40, $P_W$ denotes the widthwise dimension of each cell 42 of the multi-anode PMT 40 in the arrayed direction thereof, $H_r$ denotes the lengthwise dimension of the exit end 74 of the epi-illumination fiber 70, $P_h$ denotes the dimension of each cell 42 of the multi-anode PMT 40 in the direction orthogonal to the arrayed direction thereof, $\alpha_{ro}$ denotes an emission angle of the epi-illumination fiber 70, and θp denotes a permissible light-receiving angle of the multi-anode PMT 40 (a sensitivity of about 80% is taken as a guide).

The epi-illumination-fiber guiding unit 80 is provided with the entrance slit 82 that shapes the fluorescence emitted from the exit end 74 of the epi-illumination fiber 70. The entrance slit 82 is formed so as to extend in the same direction as the longitudinal direction of the exit end 74 of the epi-illumination fiber 70. The epi-illumination-fiber guiding unit 80 includes a collimating lens 84 that substantially collimates the fluorescence shaped by the entrance slit 82.

When performing multiphoton excitation observation, the first switching mirror 36 is disposed in the optical path between the second spectral DM 27 and the diffraction grating 32 so as to cause the fluorescence transmitted through the collimating lens 84 to enter the optical path for single-photon excitation observation to be incident on the diffraction grating 32, whereby the fluorescence can be dispersed by the diffraction grating 32.

The operation of the scanning microscope device 100 according to this embodiment having the above-described configuration will now be described.

When performing single-photon excitation observation, the fluorescence returning mirror 54 is disposed in the optical path of laser light within the scan-unit guiding projector tube 50, and the first switching mirror 36 is set in the position where it is removed from the optical path in the spectrum detection unit 30. The sample 1 is then disposed on a stage (not shown), and laser light is emitted from the single-photon-excitation light source 2.

The laser light emitted from the single-photon-excitation light source 2 undergoes transmission-wavelength control by the AOTF 4 and is guided to the scan unit 10 by the visible-light single-mode fiber 8. The laser light guided to the scan unit 10 is reflected by the scanner combining DM 12 and the excitation DM 18 and is scanned by the X-Y galvanometer mirror 14. The laser light scanned by the X-Y galvanometer mirror 14 travels through the pupil projection lens 16 and the image forming lens 52 and is reflected by the fluorescence returning mirror 54 before the objective lens 92 irradiates the sample 1 with the laser light.

Fluorescence generated in the irradiated position of the sample 1 as a result of irradiation with the laser light is collected by the objective lens 92 and is reflected by the fluorescence returning mirror 54 so as to travel along the optical path of the laser light in the reverse direction. The fluorescence then travels through the image forming lens 52 and the pupil projection lens 16 so as to be incident on the excitation DM 18 via the X-Y galvanometer mirror 14. The fluorescence incident on the excitation DM 18 is separated from the laser light and is subsequently collected by the confocal lens 22 before passing through the confocal pinhole 24.

The first spectral DM 26 causes a portion of the fluorescence passing through the confocal pinhole 24 to be incident on the 1CH_PMT 28 where the intensity thereof is detected. Furthermore, the second spectral DM 27 causes a portion of the fluorescence transmitted through the first spectral DM 26 to be incident on the 2CH_PMT 29 where the intensity thereof is detected.

The fluorescence transmitted through the first spectral DM 26 and the second spectral DM 27 enters the spectrum detection unit 30 and is dispersed in one direction by the diffraction grating 32. The dispersed fluorescence is collected by the focusing lens 34 before entering the plurality of cells 42 of the multi-anode PMT 40. Thus, the dispersed fluorescence is detected in each cell 42.

Alternatively, the fluorescence of all wavelengths can be guided to the spectrum detection unit 30 by removing the first spectral DM 26 and the second spectral DM 27 from the optical path.

Next, when performing multiphoton excitation observation, the switching means is used to dispose the non-descan-detection excitation DM 56 in the optical path of laser light within the scan-unit guiding projector tube 50, and the first switching mirror 36 is set in the position where it is disposed in the optical path of fluorescence in the spectrum detection unit 30. The sample 1 is then disposed on the stage, and laser light is emitted from the multiphoton-excitation light source 3.

The laser light emitted from the multiphoton-excitation light source 3 is transmitted through the scanner combining DM 12 and is reflected by the excitation DM 18 before being scanned by the X-Y galvanometer mirror 14. Then, the excitation light is transmitted through the pupil projection lens 16 and the image forming lens 52 and is reflected by the non-descan-detection excitation DM 56 before the objective lens 92 irradiates the sample 1 with the laser light.

Fluorescence generated in the sample 1 irradiated with the laser light is collected by the objective lens 92 and is subsequently transmitted through the non-descan-detection excitation DM 56 before entering the epi-illumination non-descan unit 60. The fluorescence incident on the epi-illumination non-descan unit 60 is transmitted through the first projector lens 62 and is reflected by the reflecting mirror 64 before the IR cut filter 66 removes infrared light therefrom. The fluorescence with the infrared light removed therefrom is transmitted through the second projector lens 68 and is made incident on the entrance end 72 of the epi-illumination fiber 70.

In this case, since the diameter and the maximum light-receivable angle of the entrance end 72 of the epi-illumination fiber 70 are set so as to satisfy formulas (1) and (2), the fluorescence from the entire scan range of the X-Y galvanometer mirror 14 can be made incident on the entrance end 72, thereby preventing optical loss in the fluorescence.

The fluorescence incident on the epi-illumination fiber 70 is emitted from the exit end 74 so as to enter the entrance slit 82 of the epi-illumination-fiber guiding unit 80. Then, the fluorescence is shaped by the entrance slit 82 and is subsequently transmitted through the collimating lens 84 where the fluorescence is substantially collimated before entering the spectrum detection unit 30.

The widthwise and lengthwise dimensions of the exit end 74 of the epi-illumination fiber 70 are set so as to satisfy formulas (3), (4), and (5). Specifically, as shown in formula (3), since the widthwise dimension of the exit end 74 projected on the multi-anode PMT 40 is smaller than the widthwise dimension of each cell 42 of the multi-anode PMT 40, sufficient wavelength resolution, determined on the basis of the dispersion by the diffraction grating 32 and the pitch of the cells 42 of the multi-anode PMT 40, can be ensured. Furthermore, as shown in formula (4), when the exit end 74 of the epi-illumination fiber 70 is projected onto the multi-anode PMT 40, the dimension thereof in the direction orthogonal to the dispersing direction of the diffraction grating 32, that is, the longitudinal direction thereof, is smaller than the dimension of each cell 42 of the multi-anode PMT 40 in the direction orthogonal to the arrayed direction thereof, so that optical loss in the fluorescence to be incident on each cell 42 can be prevented. By satisfying formula (5), a reduction in the sensitivity caused by an increase in the numerical aperture for the fluorescence to be incident on each cell 42 can be prevented, and a reduction in the wavelength resolution can also be prevented. Therefore, the fluorescence emitted from the exit end 74 can be efficiently guided to the multi-anode PMT 40 without loss of wavelength resolution.

In the spectrum detection unit 30, the fluorescence from the epi-illumination-fiber guiding unit 80 is reflected by the first switching mirror 36 so as to be made incident on the diffraction grating 32 along the same optical path as the optical path for single-photon excitation observation to be incident on the diffraction grating 32. The fluorescence is then dispersed in one direction by the diffraction grating 32 and is focused by the focusing lens 34 before entering the plurality of cells 42 of the multi-anode PMT 40.

In this case, since the exit end 74 of the epi-illumination fiber 70 is formed in a linear shape extending in the dispersing direction of the diffraction grating 32, that is, the direction orthogonal to the arrayed direction of the cells 42 of the multi-anode PMT 40, the fluorescence guided by the epi-illumination fiber 70 can be made to enter the cells 42 without loss. Furthermore, the dispersed fluorescence can be detected at once by the plurality of cells 42 instead of being detected wavelength-by-wavelength in a time-series fashion. Therefore, accurate observation can be performed even if the sample 1 is, for example, rapidly-moving biological cells labeled with multiple fluorochromes.

As described above, with the scanning microscope device 100 according to this embodiment, single-photon excitation observation and multiphoton excitation observation can be performed in a switching manner by using the scan unit 10 and the epi-illumination-observation optical system 90. When performing multiphoton excitation observation, the non-descan-detection excitation DM 56 separates the fluorescence generated in the sample 1 from the laser light, and the epi-illumination fiber 70 introduces the fluorescence into the multi-anode PMT 40 without returning the fluorescence to the X-Y galvanometer mirror 14, thereby minimizing the loss of fluorescence in the optical path from the sample 1 to the multi-anode PMT 40. Furthermore, the multi-anode PMT 40 having the multiple cells 42 can detect the dispersed fluorescence at once so as to allow for immediate tracking of temporal changes in the biological cells. Thus, spectrum detection can be performed at a high S/N ratio, high sensitivity, and high speed.

In this embodiment, although the diameter and the maximum light-receivable angle of the entrance end 72 of the epi-illumination fiber 70 are set so as to satisfy formulas (1) and (2), for example, formula (1) may alternatively be $\Phi D_r \geq \Phi p_o \times \beta_{PL}$, and formula (2) may alternatively be $\alpha_{re} \geq \theta a$.

Since there is a large amount of scattered light in a deep section of a sample (for example, about 500 μm from the surface of the sample 1), fluorescence is also generated from outside the scan range. In light of this, the diameter and the maximum light-receivable angle of the entrance end 72 of the epi-illumination fiber 70 may be set so as to satisfy not only formulas (1) and (2), but also the following formula (6):

$$\alpha_{re} > \theta b \quad (6)$$

where $\alpha_{re}$ denotes the maximum light-receivable angle of the entrance end 72 of the epi-illumination fiber 70, and θb denotes the maximum angle of incidence at the entrance end 72 of the epi-illumination fiber 70, determined on the basis of the capturable field of view of the objective lens 92.

In this manner, a greater amount of scattered fluorescence can be collected even when observing a deep section.

In this embodiment, although the scanning microscope device 100 is configured to perform single-photon excitation observation by using the fluorescence returning mirror 54, the excitation DM 18, the confocal pinhole 24, and the like, the scanning microscope device 100 need not include, for example, the fluorescence returning mirror 54, the excitation DM 18, the confocal pinhole 24, and the like and may be configured to perform only multiphoton excitation observation.

This embodiment can be modified as follows.

Figure 7:
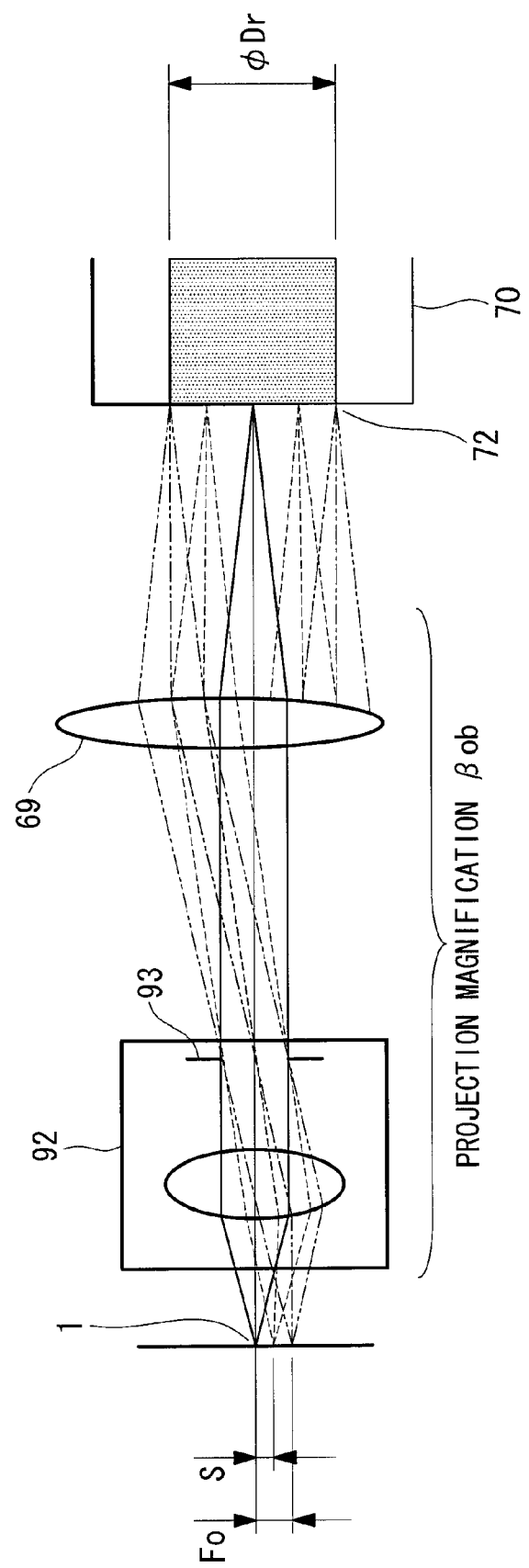
FIG. 7 is a schematic diagram illustrating an optical system between the objective lens and the entrance end of the epi-illumination fiber according to a modification of the first embodiment of the present invention.

For example, instead of arranging the pupil position 93 of the objective lens 92 and the entrance end 72 of the epi-illumination fiber 70 in an optically conjugate relationship, the sample surface and the entrance end 72 of the epi-illumination fiber 70 may have an optically conjugate relationship achieved by the objective lens 92 and a third projector lens 69, as shown in FIG. 7, such that the diameter and the maximum light-receivable angle of the entrance end 72 of the epi-illumination fiber 70 are set so as to satisfy the following formulas (7) and (8):

$$\alpha_{ob}/\beta_{ob} < \alpha_{re} \quad (7)$$

$$(\Phi 2 \times S) \times \beta_{ob} < \Phi D_r \quad (8)$$

where $\alpha_{ob}$ denotes the aperture angle (half angle) of the objective lens 92, $\beta_{ob}$ denotes the magnification for projecting the sample surface onto the entrance end 72 of the epi-illumination fiber 70, $\alpha_{re}$ denotes the maximum light-receivable angle (half angle) of the entrance end 72 of the epi-illumination fiber 70, S denotes an image height of a scan range determined on the basis of the rotating-angle range of the X-Y galvanometer mirror 14, Φ2×S denotes a scan range on the sample surface determined on the basis of the rotating-angle range of the X-Y galvanometer mirror 14, and ΦD$_r$ denotes the diameter of the entrance end 72 of the epi-illumination fiber 70.

In this case, it is desirable that the epi-illumination fiber 70 be of a type in which the transmittance does not change depending on the incidence position of the fluorescence, instead of a fiber bundle formed by bundling fibers together.

Furthermore, in this modification, the diameter of the entrance end 72 of the epi-illumination fiber 70 may be set so as to satisfy the following formula (9):

$$(\Phi 2 \times F) \times \beta_{ob} < \Phi D_r \quad (9)$$

where F denotes an image height determined on the basis of the capturable field of view of the objective lens 92, (Φ2×F) denotes the capturable range of the objective lens 92, β$_{ob}$ denotes the magnification for projecting the sample surface onto the entrance end 72 of the epi-illumination fiber 70, and ΦD$_r$ denotes the diameter of the entrance end 72 of the epi-illumination fiber 70.

In this manner, a greater amount of scattered fluorescence can be collected when observing a deep section.

Second Embodiment

Next, a scanning microscope device according to a second embodiment of the present invention will be described.

Figure 8:
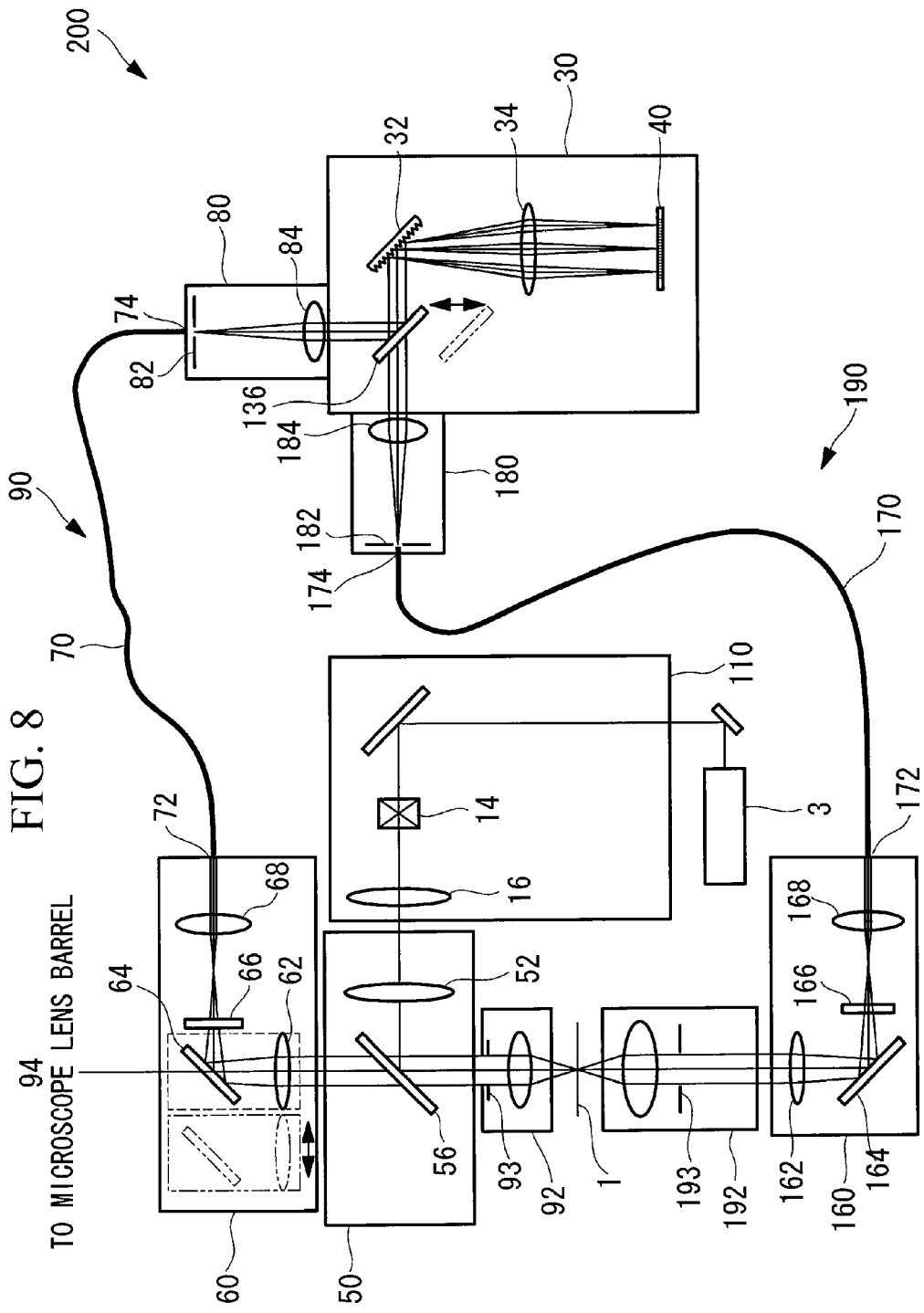
FIG. 8 is a schematic configuration diagram of a scanning microscope device according to a second embodiment of the present invention.

A scanning microscope device 200 according to this embodiment is a device for multiphoton excitation observation and differs from that in the first embodiment and the modification thereof in having a multiphoton excitation scan unit 110 and a spectrum detection unit 30 in place of the scan unit 10; an epi-illumination-observation optical system 90; and a transmission observation optical system 190, as shown in FIG. 8.

Sections having the same configuration as those in the scanning microscope device 100 according to the first embodiment and the modification thereof will be given the same reference numerals, and descriptions of those sections will be omitted.

The multiphoton excitation scan unit 110 is constituted of an X-Y galvanometer mirror 14 and a pupil projection lens 16.

A non-descan-detection excitation DM 56 is disposed in a scan-unit guiding projector tube 50.

The transmission observation optical system 190 includes a condenser lens 192 that collects fluorescence generated in a transmission direction at an irradiated position of laser light scanned on the sample 1 by the X-Y galvanometer mirror 14, a transmission non-descan unit 160 that receives the fluorescence collected by the condenser lens 192, a transmission fiber (fiber for transmission fluorescence) 170 that guides the fluorescence from the transmission non-descan unit 160 to the spectrum detection unit 30, and a transmission-fiber guiding unit 180. Reference numeral 193 denotes a pupil position of the condenser lens 192.

The transmission non-descan unit 160 is similar to the epi-illumination non-descan unit 60 in having a first projector lens 162, a reflecting mirror 164, an IR cut filter 166, and a second projector lens 168.

The pupil position 193 of the condenser lens 192 and an entrance end 172 of the transmission fiber 170 have an optically conjugate relationship achieved by the first projector lens 162 and the second projector lens 168 of the transmission non-descan unit 160.

The transmission fiber 170 has a similar configuration to the epi-illumination fiber 70 in being disposed at a conjugate position with respect to the pupil position 193 of the condenser lens 192. The diameter and the maximum light-receivable angle of the entrance end 172 of the transmission fiber 170 are set so as to satisfy the following formulas (10) and (11):

$$\Phi D_t > \Phi P_c \times \beta_{cd} \quad (10)$$

$$\alpha_{re} > \theta c \quad (11)$$

where ΦD$_t$ denotes the diameter of the entrance end 172 of the transmission fiber 170, ΦP$_c$ denotes a pupil diameter of the condenser lens 192, β$_{cd}$ denotes the projection magnification from the pupil position of the condenser lens 192 to the entrance end 172 of the transmission fiber 170, α$_{re}$ denotes the maximum light-receivable angle of the entrance end 172 of transmission fiber 170, and θc denotes a maximum angle of incidence at the entrance end 172 of the transmission fiber 170, determined on the basis of the rotating-angle range of the X-Y galvanometer mirror 14.

The widthwise and lengthwise dimensions of an exit end 174 of the transmission fiber 170 are set so as to satisfy the following formulas (12), (13), and (14):

$$W \times \beta_{PM} < P_W \quad (12)$$

$$H_t \times \beta_{PM} < P_h \quad (13)$$

$$\alpha_{to} \div \beta_{PM} < \theta p \quad (14)$$

where W denotes the widthwise dimension of the exit end 174 of the transmission fiber 170 (if the widthwise dimension of an entrance slit 182 is smaller than W, the widthwise dimension of the entrance slit 182 is defined as W), β$_{PM}$ denotes the magnification at which the exit end 174 of the transmission fiber 170 is projected onto each cell 42 of a multi-anode PMT 40, P$_W$ denotes the widthwise dimension of each cell 42 of the multi-anode PMT 40 in the arrayed direction thereof, H$_t$ denotes the lengthwise dimension of the exit end 174 of the transmission fiber 170, P$_h$ denotes the dimension of each cell 42 of the multi-anode PMT 40 in the direction orthogonal to the arrayed direction thereof, α$_{to}$ denotes an emission angle of the transmission fiber 170, and θp denotes a permissible light-receiving angle of the multi-anode PMT 40 (a sensitivity of about 80% is taken as a guide).

The transmission-fiber guiding unit 180 is configured to introduce the fluorescence guided by the transmission fiber 170 into the spectrum detection unit 30 and has a similar configuration to the epi-illumination-fiber guiding unit 80.

The spectrum detection unit 30 includes a second switching mirror (transmitted-fluorescence entrance section) 136 that switches between the fluorescence from the epi-illumination-observation optical system 90 and the fluorescence from the transmission observation optical system 190 and introduces the fluorescence to the diffraction grating 32. The second switching mirror 136 causes the fluorescence emitted from the exit end 174 of the transmission fiber 170 to enter the optical path of the fluorescence emitted from the exit end 74 of the epi-illumination fiber 70 so as to cause the fluorescence from the transmission fiber 170 to be incident on the diffraction grating 32 in place of the fluorescence from the epi-illumination fiber 70.

By using switching means (not shown), the second switching mirror 136 is disposed on the optical path when performing spectrum detection of the fluorescence from the epi-illumination-observation optical system 90, and is removed from the optical path when performing spectrum detection of the fluorescence from the transmission observation optical system 190. By disposing the second switching mirror 136 in the optical path, the fluorescence emitted from the exit end 74 of the epi-illumination fiber 70 can be reflected and be made incident on the diffraction grating 32. On the other hand, by removing the second switching mirror 136 from the optical path, the fluorescence from the exit end 174 of the transmission fiber 170 can be made incident on the diffraction grating 32 along the same optical path as the optical path from the epi-illumination fiber 70.

The operation of the scanning microscope device 200 according to this embodiment having the above-described configuration will now be described.

When performing multiphoton excitation observation using the transmission observation optical system 190, the second switching mirror 136 is set in the position where it is removed from the optical path of the spectrum detection unit 30, the sample 1 is disposed on a stage, and laser light is emitted from the multiphoton-excitation light source 3. The laser light emitted from the multiphoton-excitation light source 3 is scanned by the X-Y galvanometer mirror 14, is transmitted through the pupil projection lens 16 and the image forming lens 52, and is reflected by the non-descan-detection excitation DM 56 before the objective lens 92 irradiates the sample 1 with the laser light.

Fluorescence generated in the transmission direction at the irradiated position of the sample 1 as a result of irradiation with the laser light is collected by the condenser lens 192 and is subsequently transmitted through the first projector lens 62 and reflected by the reflecting mirror 64 before the IR cut filter 66 removes infrared light therefrom. The fluorescence with the infrared light removed therefrom is transmitted through the second projector lens 68 and is made incident on the entrance end 172 of the transmission fiber 170.

In this case, since the diameter and the maximum light-receivable angle of the entrance end 172 of the transmission fiber 170 are set so as to satisfy formulas (10) and (11), the fluorescence from the entire scan range of the X-Y galvanometer mirror 14 can be made incident on the entrance end 172, thereby preventing optical loss in the fluorescence.

The fluorescence entering the transmission fiber 170 is emitted from the exit end 174 and is substantially collimated via the entrance slit 182 and the collimating lens 184 of the transmission-fiber guiding unit 180 before entering the spectrum detection unit 30.

In the spectrum detection unit 30, the fluorescence from the transmission-fiber guiding unit 180 is made incident on the diffraction grating 32 by traveling along the same optical path as the optical path of the fluorescence from the epi-illumination fiber 70. Then, the fluorescence is dispersed in one direction by the diffraction grating 32 and is focused by the focusing lens 34 before entering the plurality of cells 42 of the multi-anode PMT 40. Consequently, the multi-anode PMT 40 can detect the fluorescence generated in the sample 1 in the transmission direction of the laser light.

As described above, with the scanning microscope device 200 according to this embodiment, by simply changing the position of the second switching mirror 136, spectrum detection of fluorescence generated in the direction in which it returns from the sample 1, performed by using the epi-illumination-observation optical system 90, and spectrum detection of fluorescence generated in the direction in which it is transmitted through the sample 1, performed by using the transmission observation optical system 190, can be performed in a switching manner.

In this embodiment, although the diameter and the maximum light-receivable angle of the entrance end 172 of the transmission fiber 170 are set so as to satisfy formulas (10) and (11), the diameter and the maximum light-receivable angle thereof may additionally be set so as to satisfy the following formula (15):

$$\alpha_{te} > \theta d_t \tag{15}$$

where $\alpha_{te}$ denotes the maximum light-receivable angle of the entrance end 172 of the transmission fiber 170, and $\theta d_t$ denotes the maximum angle of incidence at the entrance end 172 of the transmission fiber 170, determined on the basis of the capturable field of view of the condenser lens 192.

In this manner, a greater amount of scattered fluorescence can be collected when observing a deep section.

Although the embodiments of the present invention have been described in detail above with reference to the drawings, specific configurations are not to be limited to those in the embodiments and may include design modifications within the scope of the invention. For example, the present invention is not limited to the above embodiments and the modifications thereof, and may be applied to an embodiment with an appropriate combination of these embodiments and modifications; the invention is not limited in particular.

Figure 9:
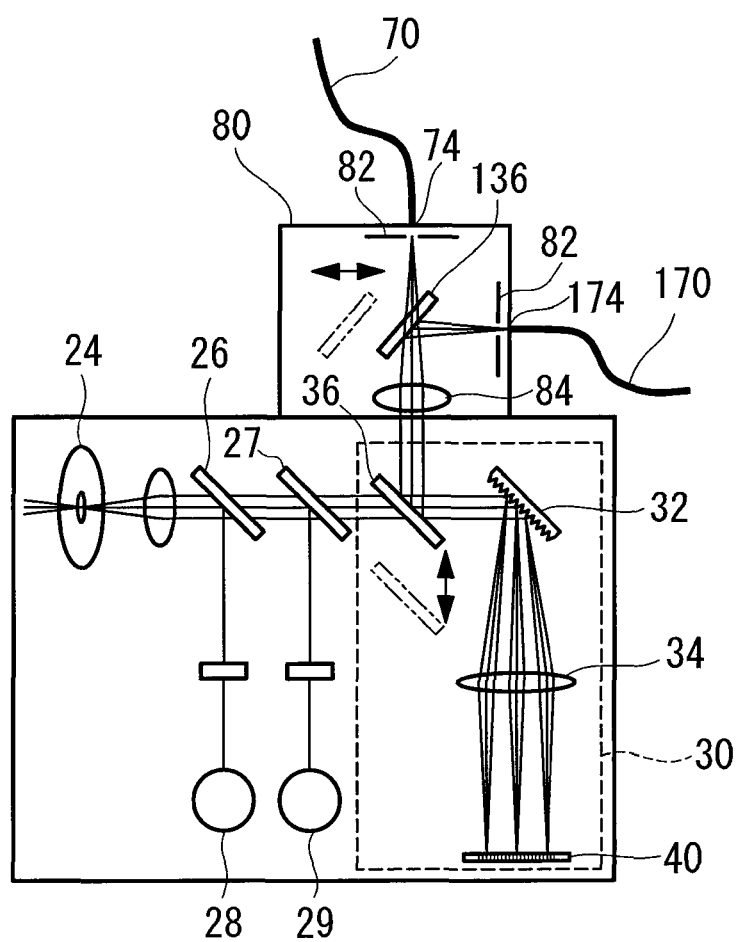
FIG. 9 is a schematic configuration diagram illustrating a spectrum detection unit and its surrounding area in a scanning microscope device according to another modification of the first embodiment of the present invention.

For example, the scanning microscope device 100 according to the first embodiment that can perform single-photon excitation observation and multiphoton excitation observation in a switching manner may further include the transmission observation optical system 190. In that case, as shown in FIG. 9, the second switching mirror 136 may be disposed in an insertable and removable manner in the optical path between the entrance slit 82 and the collimating lens 84 so that the fluorescence emitted from the exit end 174 of the transmission fiber 170 can be made to enter the optical path of the fluorescence emitted from the exit end 74 of the epi-illumination fiber 70.

Furthermore, although fluorescence produced by multiphoton excitation is described as being detected using the epi-illumination-observation optical system 90 and the transmission observation optical system 190 in the above embodiments and the modifications, light generated by a nonlinear phenomenon, such as CARS light (coherent anti-Stokes Raman scattering light) or SHG light (second-harmonic-generation light), may be detected as an alternative. Since CARS light and SHG light are generally generated at the transmission side of the sample 1, the light may be detected by using the transmission fiber 170 or the like constituting the transmission observation optical system 190.

Furthermore, when observing a multi-stained fluorescent sample in each of the above embodiments, the scanning microscope device 100 or 200 may include an image processor that performs wavelength separation on multiple kinds of fluorescence on the basis of the spectrum of fluorescence detected by the cells 42, and a monitor that displays an image of each kind of fluorescence having undergone the wavelength separation performed by the image processor. In this manner, the image processor can separate multiple fluorochromes with large crossover and display them on the monitor. Moreover, the scanning microscope device 100 or 200 may include a storage section that stores the spectrum detection results of the sample 1 at predetermined intervals of time. In this manner, temporal changes in the sample 1 can be observed.

Figure 10:
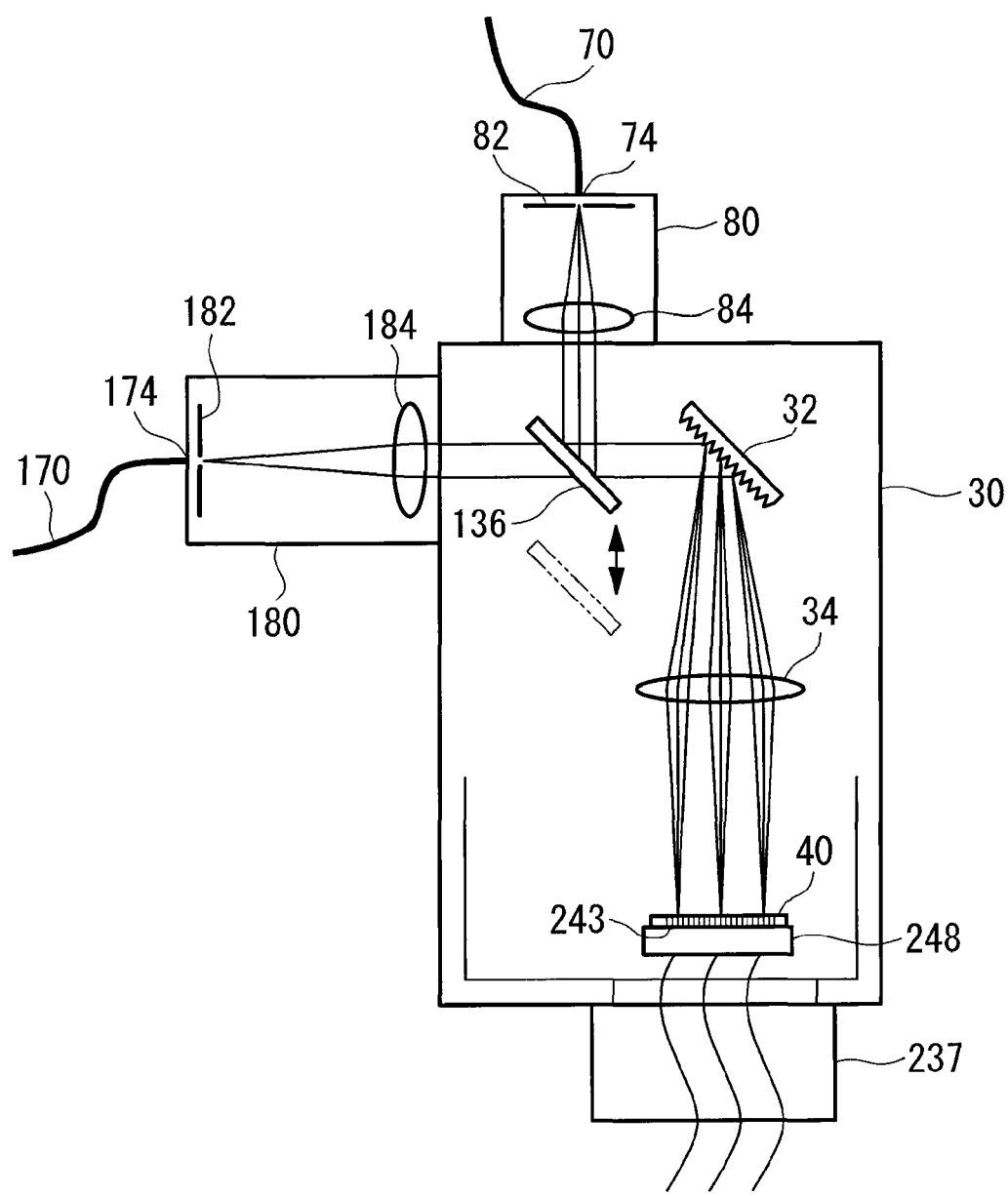
FIG. 10 is a schematic configuration diagram illustrating a spectrum detection unit in a scanning microscope device according to a modification of the second embodiment of the present invention.
Figure 11:
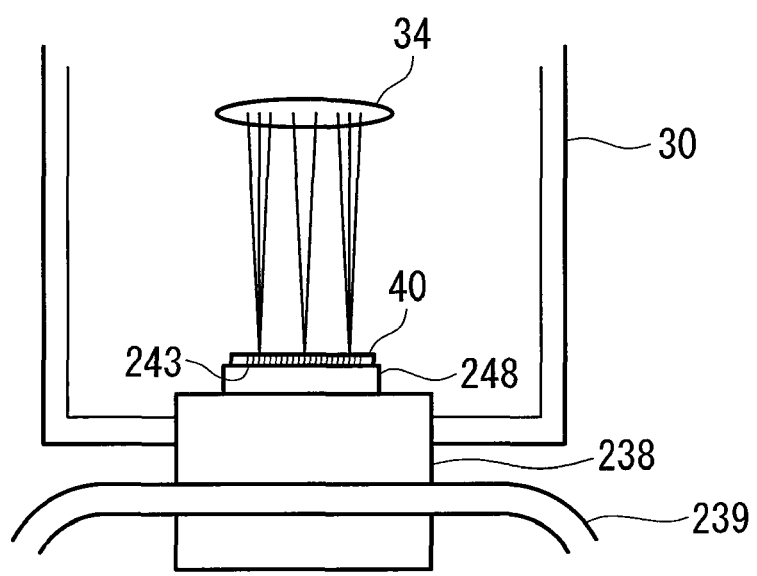
FIG. 11 is a schematic configuration diagram illustrating a spectrum detection unit in a scanning microscope device according to another modification of the second embodiment of the present invention.

Furthermore, in the above embodiments and the modifications thereof, for example, the multi-anode PMT 40 may include a Peltier device (cooling device) that cools photoelectric surfaces of the cells 42. In this case, in the scanning microscope device 200 according to the second embodiment, for example, a cooling surface of a Peltier device 248 may be disposed so as to be joined to photoelectric surfaces 243 of all the cells 42, as shown in FIG. 10 or 11. The Peltier device 248 can cool the photoelectric surfaces 243 to, for example, −5° C. so as to reduce noise in the multi-anode PMT 40.

Furthermore, the spectrum detection unit 30 may include a forced air cooling fan (heat exhauster) 237, as shown in FIG. 10, or a heat dissipating member 238 and a water-cooled tube 239, as shown in FIG. 11, as a device that externally releases the heat generated when the Peltier device 248 cools the photoelectric surfaces 243 of the cells 42. In this case, since a surface (heat dissipating surface) opposite the cooling surface of the Peltier device 248 generates heat due to heat exchange, the forced air cooling fan 237 may be disposed on the heat-dissipating-surface side of the Peltier device 248, or the heat dissipating member 238 and the water-cooled tube 239 may be disposed on the heat-dissipating-surface side. By using the forced air cooling fan 237 or the water-cooled tube 239 to externally release the heat in the Peltier device 248, a temperature increase in the multi-anode PMT 40 can be prevented.

In this case, since a microscope section constituted of the multiphoton excitation scan unit 110, the scan-unit guiding projector tube 50, the objective lens 92, the epi-illumination non-descan unit 60, the transmission non-descan unit 160, and the like is optically connected to the spectrum detection unit 30 via the epi-illumination fiber 70 and the transmission fiber 170, the microscope section can be prevented from being affected by vibrations occurring due to actuation of the forced air cooling fan 237 or by vibrations occurring due to pulsation of fluid flowing through the water-cooled tube 239. Therefore, spectrum detection can be performed at a high S/N ratio and with high accuracy. Although this modification is described as being applied to the scanning microscope device 200 as an example, the modification can also be applied to the scanning microscope device 100 according to the first embodiment.

What is claimed is:

1. A scanning microscope device comprising:
a light source that irradiates a sample with laser light;
a scanner that scans the laser light from the light source on the sample;
an objective lens that irradiates the sample with the laser light scanned by the scanner and collects fluorescence generated at an irradiated position of the laser light;
a wavelength separator that is disposed between the scanner and the objective lens and separates the laser light and the fluorescence from each other;
a fiber for epi-fluorescence that receives the fluorescence separated by the wavelength separator through an entrance end thereof, guides the fluorescence, and emits the fluorescence from an exit end thereof that is formed in a substantially linear shape;
a dispersing element that disperses the fluorescence emitted from the exit end of the fiber for epi-fluorescence in a direction orthogonal to a longitudinal direction of the exit end;
a multi-anode photomultiplier tube having a plurality of detectors arrayed in the dispersing direction of the fluorescence dispersed by the dispersing element;
a fluorescence returner that is disposed in a replaceable manner with the wavelength separator and that returns the fluorescence collected by the objective lens to an optical path of the laser light;
switching means that switches between the fluorescence returner and the wavelength separator;
a confocal pinhole that is disposed at a conjugate position with respect to a focal position of the objective lens and that allows part of the fluorescence returned to the optical path of the laser light by the fluorescence returner, switched by the switching means, and transmitted through the scanner to pass therethrough; and
a descanned fluorescence entrance section that causes the fluorescence passing through the confocal pinhole to enter the optical path of the fluorescence emitted from the exit end of the fiber for epi-fluorescence.

2. The scanning microscope device according to claim 1, further comprising:
a condenser lens that collects fluorescence generated in a transmission direction at the irradiated position of the laser light scanned on the sample by the scanner;
a fiber for transmission fluorescence that receives the fluorescence collected by the condenser lens through an entrance end thereof, guides the fluorescence, and emits the fluorescence toward the dispersing element from an exit end thereof that is formed in a substantially linear shape extending in a direction orthogonal to the dispersing direction of the dispersing element; and
a transmitted-fluorescence entrance section that causes the fluorescence emitted from the exit end of the fiber for transmission fluorescence to enter an optical path of the fluorescence emitted from the exit end of the fiber for epi-fluorescence so as to cause the fluorescence from the fiber for transmission fluorescence to be incident on the dispersing element in place of the fluorescence from the fiber for epi-fluorescence.

3. The scanning microscope device according to claim 1, wherein each detector includes a photoelectric surface that performs photoelectric conversion on the fluorescence, and wherein a cooling device that cools the photoelectric surfaces is equipped with the multi-anode photomultiplier tube.

4. The scanning microscope device according to claim 3, wherein a microscope section having the objective lens is separately provided from a detection unit,
wherein the microscope section is optically connected to the detection unit via the fiber for epi-fluorescence, and
wherein the detection unit including the multi-anode photomultiplier tube comprises a heat exhauster that externally releases heat generated when the photoelectric surfaces are cooled by the cooling device.

5. The scanning microscope device according to claim 2, wherein a microscope section having the objective lens is separately provided from a detection unit,
wherein the microscope section is optically connected to the detection unit via the fiber for epi-fluorescence and/or the fiber for transmission fluorescence,
wherein each detector includes a photoelectric surface that performs photoelectric conversion on the fluorescence,
wherein a cooling device that cools the photoelectric surfaces is equipped with the multi-anode photomultiplier tube, and
wherein the detection unit including the multi-anode photomultiplier tube comprises a heat exhauster that externally releases heat generated when the photoelectric surfaces are cooled by the cooling device.

6. A scanning microscope device comprising:
a light source that irradiates a sample with laser light;
a scanner that scans the laser light from the light source on the sample;
an objective lens that irradiates the sample with the laser light scanned by the scanner and collects fluorescence generated at an irradiated position of the laser light;
a wavelength separator that is disposed between the scanner and the objective lens and separates the laser light and the fluorescence from each other;

a fiber for epi-fluorescence that receives the fluorescence separated by the wavelength separator through an entrance end thereof, guides the fluorescence, and emits the fluorescence from an exit end thereof that is formed in a substantially linear shape;

a dispersing element that disperses the fluorescence emitted from the exit end of the fiber for epi-fluorescence in a direction orthogonal to a longitudinal direction of the exit end; and a multi-anode photomultiplier tube having a plurality of detectors arrayed in the dispersing direction of the fluorescence dispersed by the dispersing element;

wherein the entrance end of the fiber for epi-fluorescence is disposed at a conjugate position with respect to a pupil position of the objective lens, and has a diameter and a maximum light-receivable angle that satisfy the following formulas:

$$\Phi D_r \geq \Phi p_o \times \beta_{PL}$$

$$\alpha_{re} \geq \theta ea$$

where $\Phi D_r$ denotes the diameter of the entrance end of the fiber for epi-fluorescence, $\Phi p_o$ denotes a pupil diameter of the objective lens, $\beta_{PL}$ denotes a projection magnification from the pupil position of the objective lens to the entrance end of the fiber for epi-fluorescence, $\alpha_{re}$ denotes the maximum light-receivable angle of the entrance end of the fiber for epi-fluorescence, and ea denotes a maximum angle of incidence at the entrance end of the fiber for epi-fluorescence, determined on the basis of a scan range of the scanner.

7. The scanning microscope device according to claim 6, wherein the maximum light-receivable angle of the entrance end of the fiber for epi-fluorescence further satisfies the following formula:

$$\alpha_{re} > \theta b$$

where $\alpha_{re}$ denotes the maximum light-receivable angle of the entrance end of the fiber for epi-fluorescence, and $\theta b$ denotes a maximum angle of incidence at the entrance end of the fiber for epi-fluorescence, determined on the basis of a capturable field of view of the objective lens.

8. A scanning microscope device comprising:
a light source that irradiates a sample with laser light;
a scanner that scans the laser light from the light source on the sample;
an objective lens that irradiates the sample with the laser light scanned by the scanner and collects fluorescence generated at an irradiated position of the laser light;
a wavelength separator that is disposed between the scanner and the objective lens and separates the laser light and the fluorescence from each other;
a fiber for epi-fluorescence that receives the fluorescence separated by the wavelength separator through an entrance end thereof, guides the fluorescence, and emits the fluorescence from an exit end thereof that is formed in a substantially linear shape;
a dispersing element that disperses the fluorescence emitted from the exit end of the fiber for epi-fluorescence in a direction orthogonal to a longitudinal direction of the exit end; and
a multi-anode photomultiplier tube having a plurality of detectors arrayed in the dispersing direction of the fluorescence dispersed by the dispersing element;
wherein the exit end of the fiber for epi-fluorescence has a widthwise dimension and a lengthwise dimension that satisfy the following formulas:

$$W \times \beta_{PM} < P_W$$

$$H_r \times \beta_{PM} < P_h$$

$$\alpha_{ro} \div \beta_{PM} < \theta p$$

where W denotes the widthwise dimension of the exit end of the fiber for epi-fluorescence, $\beta_{PM}$ denotes a magnification at which the exit end of the fiber for epi-fluorescence is projected onto the multi-anode photomultiplier tube, $P_W$ denotes a widthwise dimension of each detector of the multi-anode photomultiplier tube in the arrayed direction thereof, $H_r$ denotes the lengthwise dimension of the exit end of the fiber for epi-fluorescence, $P_h$ denotes a dimension of each detector of the multi-anode photomultiplier tube in a direction orthogonal to the arrayed direction, $\alpha_{ro}$ denotes an emission angle of the fiber for epi-fluorescence, and $\theta p$ denotes a permissible light-receiving angle of the multi-anode photomultiplier tube.

9. A scanning microscope comprising:
a light source that irradiates a sample with laser light;
a scanner that scans the laser light from the light source on the sample;
an objective lens that irradiates the sample with the laser light scanned by the scanner and collects fluorescence generated at an irradiated position of the laser light;
a wavelength separator that is disposed between the scanner and the objective lens and separates the laser light and the fluorescence from each other;
a fiber for epi-fluorescence that receives the fluorescence separated by the wavelength separator through an entrance end thereof, guides the fluorescence, and emits the fluorescence from an exit end thereof that is formed in a substantially linear shape;
a dispersing element that disperses the fluorescence emitted from the exit end of the fiber for epi-fluorescence in a direction orthogonal to a longitudinal direction of the exit end; and
a plurality of cylindrical lenses arrayed in a vicinity of light-receiving surfaces of the detectors of the multi-anode photomultiplier tube, wherein the cylindrical lenses are arrayed at a pitch that substantially matches a pitch at which the detectors are arrayed, and wherein the cylindrical lenses are disposed in correspondence with the respective detectors.

10. The scanning microscope device according to claim 9, wherein a dimension of each cylindrical lens in a direction with no lens power is greater than a dimension of an incidence range of the fluorescence to be incident on each detector.

11. The scanning microscope device according to claim 1, further comprising an image processor that performs wavelength separation on the fluorescence detected by the detectors, and a monitor that displays an image of the fluorescence subjected to the wavelength separation performed by the image processor.

12. The scanning microscope device according to claim 1, further comprising a storage section that stores spectrum detection results of the sample at predetermined intervals of time.

13. A scanning microscope device comprising:
a light source that irradiates a sample with laser light;
a scanner that scans the laser light from the light source on the sample;
a condenser lens that collects fluorescence generated in a transmission direction at an irradiated position of the laser light scanned on the sample by the scanner;
a fiber for transmission fluorescence that receives the fluorescence collected by the condenser lens through an entrance end thereof, guides the fluorescence, and emits the fluorescence from an exit end thereof that is formed in a substantially linear shape;

a dispersing element that disperses the fluorescence emitted from the exit end of the fiber for transmission fluorescence in a direction orthogonal to a longitudinal direction of the exit end; and a multi-anode photomultiplier tube having a plurality of detectors arrayed in the dispersing direction of the fluorescence dispersed by the dispersing element;

wherein the entrance end of the fiber for transmission fluorescence is disposed at a conjugate position with respect to a pupil position of the condenser lens, and has a diameter and a maximum light-receivable angle that satisfy the following formulas:

$$\Phi D_t > \Phi P_c \times \beta_{cd}$$

$$\alpha_{te} > \theta c$$

where $\Phi D_t$ denotes the diameter of the entrance end of the fiber for transmission fluorescence, $\Phi P_c$ denotes a pupil diameter of the condenser lens, $\beta_{cd}$ denotes a projection magnification from the pupil position of the condenser lens to the entrance end of the fiber for transmission fluorescence, $\alpha_{te}$ denotes the maximum light-receivable angle of the fiber for transmission fluorescence, and $\theta c$ denotes a maximum angle of incidence at the fiber for transmission fluorescence, determined on the basis of a scan range of the scanner.

14. The scanning microscope device according to claim 13, wherein each detector includes a photoelectric surface that performs photoelectric conversion on the fluorescence, and wherein a cooling device that cools the photoelectric surfaces is equipped with the multi-anode photomultiplier tube.

15. The scanning microscope device according to claim 14, wherein a microscope section having the objective lens is separately provided from a detection unit, wherein the microscope section is optically connected to the detection unit via the fiber for transmission fluorescence, and wherein the detection unit including the multi-anode photomultiplier tube comprises a heat exhauster that externally releases heat generated when the photoelectric surfaces are cooled by the cooling device.

16. The scanning microscope device according to claim 13, wherein the maximum light-receivable angle of the entrance end of the fiber for transmission fluorescence further satisfies the following formula:

$$\alpha_{te} > \theta d_t$$

where $\alpha_{te}$ denotes the maximum light-receivable angle of the fiber for transmission fluorescence, and $\theta d_t$ denotes a maximum angle of incidence at the fiber for transmission fluorescence, determined on the basis of a capturable field of view of the condenser lens.

17. A scanning microscope device comprising:
a light source that irradiates a sample with laser light;
a scanner that scans the laser light from the light source on the sample;
a condenser lens that collects fluorescence generated in a transmission direction at an irradiated position of the laser light scanned on the sample by the scanner;
a fiber for transmission fluorescence that receives the fluorescence collected by the condenser lens through an entrance end thereof, guides the fluorescence, and emits the fluorescence from an exit end thereof that is formed in a substantially linear shape;

a dispersing element that disperses the fluorescence emitted from the exit end of the fiber for transmission fluorescence in a direction orthogonal to a longitudinal direction of the exit end; and a multi-anode photomultiplier tube having a plurality of detectors arrayed in the dispersing direction of the fluorescence dispersed by the dispersing element;

wherein the exit end of the fiber for transmission fluorescence has a widthwise dimension and a lengthwise dimension that satisfy the following formulas:

$$W \times \beta_{PM} < P_W$$

$$H_t \times \beta_{PM} < P_h$$

$$\alpha_{to} \div \beta_{PM} < \theta p$$

where W denotes the widthwise dimension of the exit end of the fiber for transmission fluorescence, $\beta_{PM}$ denotes a magnification at which the exit end of the fiber for transmission fluorescence is projected onto the multi-anode photomultiplier tube, $P_W$ denotes a widthwise dimension of each detector of the multi-anode photomultiplier tube in the arrayed direction thereof, $H_t$ denotes the lengthwise dimension of the exit end of the fiber for epi-fluorescence, $P_h$ denotes a dimension of each detector of the multi-anode photomultiplier tube in a direction orthogonal to the arrayed directions, $\alpha_{to}$ denotes an emission angle of the fiber for transmission fluorescence, and ep denotes a permissible light-receiving angle of the multi-anode photomultiplier tube.

18. A scanning microscope device comprising:
a light source that irradiates a sample with laser light;
a scanner that scans the laser light from the light source on the sample;
a condenser lens that collects fluorescence generated in a transmission direction at an irradiated position of the laser light scanned on the sample by the scanner;
a fiber for transmission fluorescence that receives the fluorescence collected by the condenser lens through an entrance end thereof, guides the fluorescence, and emits the fluorescence from an exit end thereof that is formed in a substantially linear shape;
a dispersing element that disperses the fluorescence emitted from the exit end of the fiber for transmission fluorescence in a direction orthogonal to a longitudinal direction of the exit end;
a multi-anode photomultiplier tube having a plurality of detectors arrayed in the dispersing direction of the fluorescence dispersed by the dispersing element; and
a plurality of cylindrical lenses arrayed in a vicinity of light-receiving surfaces of the detectors of the multi-anode photomultiplier tube, wherein the cylindrical lenses are arrayed at a pitch that substantially matches a pitch at which the detectors are arrayed, and wherein the cylindrical lenses are disposed in correspondence with the respective detectors.

19. The scanning microscope device according to claim 18, wherein a dimension of each cylindrical lens in a direction with no lens power is greater than a dimension of an incidence range of the fluorescence to be incident on each detector.

20. The scanning microscope device according to claim 13, further comprising an image processor that performs wavelength separation on the fluorescence detected by the detectors, and a monitor that displays an image of the fluorescence subjected to the wavelength separation performed by the image processor.

21. The scanning microscope device according to claim 13, further comprising a storage section that stores spectrum detection results of the sample at predetermined intervals of time.

22. The scanning microscope device according to claim 6, wherein each detector includes a photoelectric surface that performs photoelectric conversion on the fluorescence, and wherein a cooling device that cools the photoelectric surfaces is equipped with the multi-anode photomultiplier tube.

23. The scanning microscope device according to claim 8, wherein each detector includes a photoelectric surface that performs photoelectric conversion on the fluorescence, and wherein a cooling device that cools the photoelectric surfaces is equipped with the multi-anode photomultiplier tube.

24. The scanning microscope device according to claim 9, wherein each detector includes a photoelectric surface that performs photoelectric conversion on the fluorescence, and wherein a cooling device that cools the photoelectric surfaces is equipped with the multi-anode photomultiplier tube.

25. The scanning microscope device according to claim 6, further comprising an image processor that performs wavelength separation on the fluorescence detected by the detectors, and a monitor that displays an image of the fluorescence subjected to the wavelength separation performed by the image processor.

26. The scanning microscope device according to claim 8, further comprising an image processor that performs wavelength separation on the fluorescence detected by the detectors, and a monitor that displays an image of the fluorescence subjected to the wavelength separation performed by the image processor.

27. The scanning microscope device according to claim 9, further comprising an image processor that performs wavelength separation on the fluorescence detected by the detectors, and a monitor that displays an image of the fluorescence subjected to the wavelength separation performed by the image processor.

28. The scanning microscope device according to claim 6, further comprising a storage section that stores spectrum detection results of the sample at predetermined intervals of time.

29. The scanning microscope device according to claim 8, further comprising a storage section that stores spectrum detection results of the sample at predetermined intervals of time.

30. The scanning microscope device according to claim 9, further comprising a storage section that stores spectrum detection results of the sample at predetermined intervals of time.

31. The scanning microscope device according to claim 17, wherein each detector includes a photoelectric surface that performs photoelectric conversion on the fluorescence, and
wherein a cooling device that cools the photoelectric surfaces is equipped with the multi-anode photomultiplier tube.

32. The scanning microscope device according to claim 18, wherein each detector includes a photoelectric surface that performs photoelectric conversion on the fluorescence, and
wherein a cooling device that cools the photoelectric surfaces is equipped with the multi-anode photomultiplier tube.

33. The scanning microscope device according to claim 17, further comprising an image processor that performs wavelength separation on the fluorescence detected by the detectors, and a monitor that displays an image of the fluorescence subjected to the wavelength separation performed by the image processor.

34. The scanning microscope device according to claim 18, further comprising an image processor that performs wavelength separation on the fluorescence detected by the detectors, and a monitor that displays an image of the fluorescence subjected to the wavelength separation performed by the image processor.

35. The scanning microscope device according to claim 17, further comprising a storage section that stores spectrum detection results of the sample at predetermined intervals of time.

36. The scanning microscope device according to claim 18, further comprising a storage section that stores spectrum detection results of the sample at predetermined intervals of time.

37. The scanning microscope device according to claim 6, further comprising:
a condenser lens that collects fluorescence generated in a transmission direction at the irradiated position of the laser light scanned on the sample by the scanner;
a fiber for transmission fluorescence that receives the fluorescence collected by the condenser lens through an entrance end thereof, guides the fluorescence, and emits the fluorescence toward the dispersing element from an exit end thereof that is formed in a substantially linear shape extending in a direction orthogonal to the dispersing direction of the dispersing element; and
a transmitted-fluorescence entrance section that causes the fluorescence emitted from the exit end of the fiber for transmission fluorescence to enter an optical path of the fluorescence emitted from the exit end of the fiber for epi-fluorescence so as to cause the fluorescence from the fiber for transmission fluorescence to be incident on the dispersing element in place of the fluorescence from the fiber for epi-fluorescence.

38. The scanning microscope device according to claim 8, further comprising:
a condenser lens that collects fluorescence generated in a transmission direction at the irradiated position of the laser light scanned on the sample by the scanner;
a fiber for transmission fluorescence that receives the fluorescence collected by the condenser lens through an entrance end thereof, guides the fluorescence, and emits the fluorescence toward the dispersing element from an exit end thereof that is formed in a substantially linear shape extending in a direction orthogonal to the dispersing direction of the dispersing element; and
a transmitted-fluorescence entrance section that causes the fluorescence emitted from the exit end of the fiber for transmission fluorescence to enter an optical path of the fluorescence emitted from the exit end of the fiber for epi-fluorescence so as to cause the fluorescence from the fiber for transmission fluorescence to be incident on the dispersing element in place of the fluorescence from the fiber for epi-fluorescence.

39. The scanning microscope device according to claim 9, further comprising:
a condenser lens that collects fluorescence generated in a transmission direction at the irradiated position of the laser light scanned on the sample by the scanner;
a fiber for transmission fluorescence that receives the fluorescence collected by the condenser lens through an entrance end thereof, guides the fluorescence, and emits the fluorescence toward the dispersing element from an exit end thereof that is formed in a substantially linear shape extending in a direction orthogonal to the dispersing direction of the dispersing element; and a transmitted-fluorescence entrance section that causes the fluorescence emitted from the exit end of the fiber for transmission fluorescence to enter an optical path of the fluorescence emitted from the exit end of the fiber for epi-fluorescence so as to cause the fluorescence from the fiber for transmission fluorescence to be incident on the dispersing element in place of the fluorescence from the fiber for epi-fluorescence.

* * * * *